United States Patent
Metcalfe et al.

(10) Patent No.: US 6,233,360 B1
(45) Date of Patent: May 15, 2001

(54) METHOD AND SYSTEM FOR HYBRID ERROR DIFFUSION PROCESSING OF IMAGE INFORMATION USING ADAPTIVE WHITE AND BLACK REFERENCE VALUES

(75) Inventors: David J. Metcalfe, Marion; Roger L. Triplett, Penfield; Xiao-fan Feng, Webster; John T. Newell, Fairport, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/718,799

(22) Filed: Sep. 24, 1996

(51) Int. Cl.[7] .............................. G06K 9/36; G06K 9/38; G06K 9/46; G06K 9/00
(52) U.S. Cl. .......................... 382/252; 382/168; 382/172
(58) Field of Search ..................... 382/251, 252, 382/172, 271, 168, 270; 358/406, 445, 446, 534, 536, 448, 456, 457, 458, 465, 466

(56) References Cited

U.S. PATENT DOCUMENTS 5,331,428 * 7/1994 Uffel ................................. 358/446
5,608,821 * 3/1997 Metcalfe et al. ..................... 382/252
5,724,444 * 3/1998 Yamanishi ........................... 382/168

OTHER PUBLICATIONS

R.C.Gonzalez and R.C.Woods, "Digital image processing", Addison–Welsey Publishing Company, Inc., 1992, pp. 443, 444, 447, 448, 1992.*

* cited by examiner

Primary Examiner—Phuoc Tran
Assistant Examiner—Dmitry A. Novik
(74) Attorney, Agent, or Firm—M J. Nickerson

(57) ABSTRACT

A method and system implements a high addressability characteristic into an error diffusion process. A histogram of the image is generated and the actual background and black reference values are determined. A gray level value representing a pixel is received. The gray level value has a first resolution which corresponds to an original input resolution. The gray level value is interpolated to generate subpixel gray level values which correspond to a second resolution. The second resolution is higher than the first resolution and corresponds to the high addressability characteristic. A threshold circuit thresholds the interpolated gray level value and generates an error value as a result of the threshold using the determined background and black reference values. The error value has a resolution corresponding to the first resolution. A portion of the error value is diffused to adjacent pixels on a next scanline.

31 Claims, 21 Drawing Sheets

Desired Output = $\dfrac{P0_i + P1_i}{2}$

Actual Output = $\dfrac{n*255}{N}$

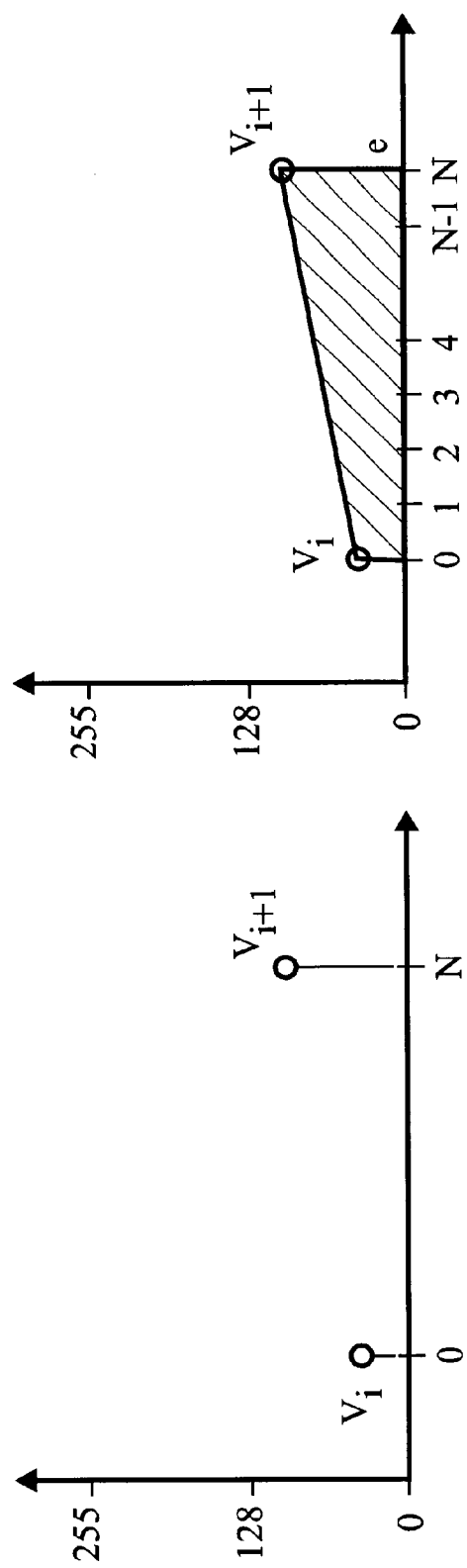

METHOD AND SYSTEM FOR HYBRID ERROR DIFFUSION PROCESSING OF IMAGE INFORMATION USING ADAPTIVE WHITE AND BLACK REFERENCE VALUES

FIELD OF THE PRESENT INVENTION

The present invention relates to the conversion of images from multi-level grey scale pixel values to a reduced number of levels pixel values. More specifically, the present invention relates to the conversion of multi-level grey scale pixel values to a reduced number of levels pixel values using a high addressable error diffusion technique with adaptive white and black reference values

BACKGROUND OF THE PRESENT INVENTION

Image information, be it color or black and white, is commonly derived by scanning, initially at least, in a grey level format containing a large number of levels, e.g.: 256 levels for black and white and more than 16 million ($256^3$) levels for color. This multi-level format is usually unprintable by standard printers.

The term "grey lever" is used to described such data for both black and white and color applications. Standard printers print in a limed number of levels, either a spot or a no spot in the binary case, or a limited number of levels associated with the spot, for example, four in the quaternary case. Since grey level image data may be represented by very large values, it is necessary to reduce grey level image data to a led number of levels so that it is printable. Besides grey level image information derived by scanning, certain processing techniques, such as computer generation, produce grey level pixel values which require such a conversion.

One standard method of converting grey level pixel image data to binary level pixel image data is through the use of error diffusion. This process, however, assumes that a printer is an ideal device wherein black pixels and white pixels can be rendered not withstanding their effective size. A conventional error diffusion process will be discussed below.

In a conventional error diffusion process, input grey video is inputted to an adder wherein slowscan error, which represents error from the processing of the previous scanline of pixels, stored in a FIFO is added to the input grey video. Moreover, fastscan error from an error distribution circuit is also added to the input grey video at the adder. The fastscan error from the error distribution circuit represents the error from processing the previous pixel in the same scanline. The modified input grey video ($Pix_N$) is then fed to a comparator which compares the modified input grey video with a threshold value. Based on the comparison with the threshold value, the comparator outputs a binary output of either 1 or 0. The modified input grey video is also fed to a subtraction circuit and a multiplexer. The subtraction circuit generates a value representative of the difference between a black reference value and the modified input grey video value. This difference is also fed to the multiplexer. The multiplexer selects either the difference value or the modified input grey video value as the pixel error for the presently processed pixel based on the binary output from comparator. This pixel error is fed to the error distribution circuit which utilizes a plurality of weighting coefficients to distribute the error to various adjacent pixels.

However, there is a problem when using conventional error diffusion in that the reference values used for calculating and propagating the error are assumed; ie., the "black" and "white" reference values are assumed which in a typical case would be 255 and 0, respectively, for a write-black printer processing an image having 256 possible grey levels per pixel. Using such an assumption yields undesirable results from an image with a background value less than 255.

It is noted that in a white-black system the original image values are inverted prior to processing thus, the white level for the original image data would be 255, whereas in the write-black system the same white level would be converted to 0. This inversion technique is commonly used in the printing art.

In an image with a background value less than 255 results in an image that is "speckled" with black dots when the image is processed by an error diffusion technique that has made the above assumptions for the reference "black" and "white" values. This artifact is typically compensated for by utilizing a tonal-reproduction correction curve look-up table (TRC LUT) to alter the grey video signal prior to being processed by the conventional error diffusion routine. However, this technique has several disadvantages, namely, a TRC LUT (random access memory) is relatively expensive if it is being utilized in a low-cost digital reprographic machine and there may not be enough time to download the updated TRC values on a scanline-by-scanline basis due to system time constraints.

Therefore, it is desirable to have an error diffusion technique which avoids the generation of "speckled" image and also does not rely on a TRC LUT compensation method. The present invention provides an error diffusion routine that modifies the "black" and "white" reference values based on knowledge of the image's background value and black reference value.

SUMMARY OF THE PRESENT INVENTION

A first aspect of the present invention is a method of diffusing an error generated from thresholding a grey level value representing a pixel. The method determines an actual background value and an actual black reference value for an image to be thresholded; receives the grey level value representing the pixel the grey level value having a first resolution; converts the grey level value to a second resolution, the second resolution being higher than the first resolution; thresholds the converted grey level value; generating an error value as a result of a threshold determination using the determined actual background and black reference values, the error value having a resolution corresponding to the first resolution; and diffuses the error value to grey level values representing adjacent pixels.

A second aspect of the present invention is a system for diffusing an error generated from thresholding a grey level value representing a pixel. The system includes histogram means for determining an actual background value and an actual black reference value for an image to be thresholded; input means for receiving the grey level value representing the pixel, the grey level value having a first resolution; high addressability means for converting the grey level value to a second resolution, the second resolution being higher than the first resolution; threshold means for thresholding the converted grey level value; error means for generating an error value as a result of a threshold determination by the threshold means using the actual background value and black reference value determined by the histogram means, the error value having a resolution corresponding to the first resolution; and error diffusing means for diffusing the error value to grey level values representing adjacent pixels.

A third aspect of the present invention is a method of generating an error from a threshold process. The method determines an actual background value and an actual black reference value for an image to be thresholded; thresholds a grey level value of a pixel having a first resolution; and generates an error value as a result of thresholding the grey level value using the determined actual background and black reference values, the error value having a second resolution, the second resolution being lower than the first resolution.

A fourth aspect of the present invention is a system for generating an error from a threshold process. The system includes histogram means for determining an actual background value and an actual black reference value for an image to be thresholded; threshold means for thresholding a grey level value of a pixel having a first resolution; and error means for generating an error value as a result of thresholding by the threshold means using the actual background value and black reference value determined by the histogram means, the error value having a second resolution, the second resolution being lower than the first resolution.

A fifth aspect of the present invention is a printing system for rendering marks on a receiving medium. The system includes histogram means for determining an actual background value and an actual black reference value for an image to be thresholded; receiving means for receiving a grey level signal corresponding to a pixel having a first resolution; interpolation means for converting the grey level signal to a second resolution, the second resolution being higher than the first resolution; binarization means for binarizing the converted grey level signal so as to output a binary signal and an error signal, the error signal having a resolution equal to the first resolution and being calculated using the actual background value and black reference value determined by the histogram means; diffusing means for diffusing the error value to grey level signals corresponding to pixels adjacent to the pixel having the first resolution; and rendering means for converting the binary signal into a mark on the receiving medium.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, and thus, are being presented for illustration purposes only and should not be limitative of the scope of the present invention, wherein:

FIGS. 11A–11B show a graphical representation illustrating the obtaining boundary subpixel values in parallel with the computing a desired output value;

DETAILED DESCRIPTION OF THE PRESENT INVENTION

Figures 12A, 12B:
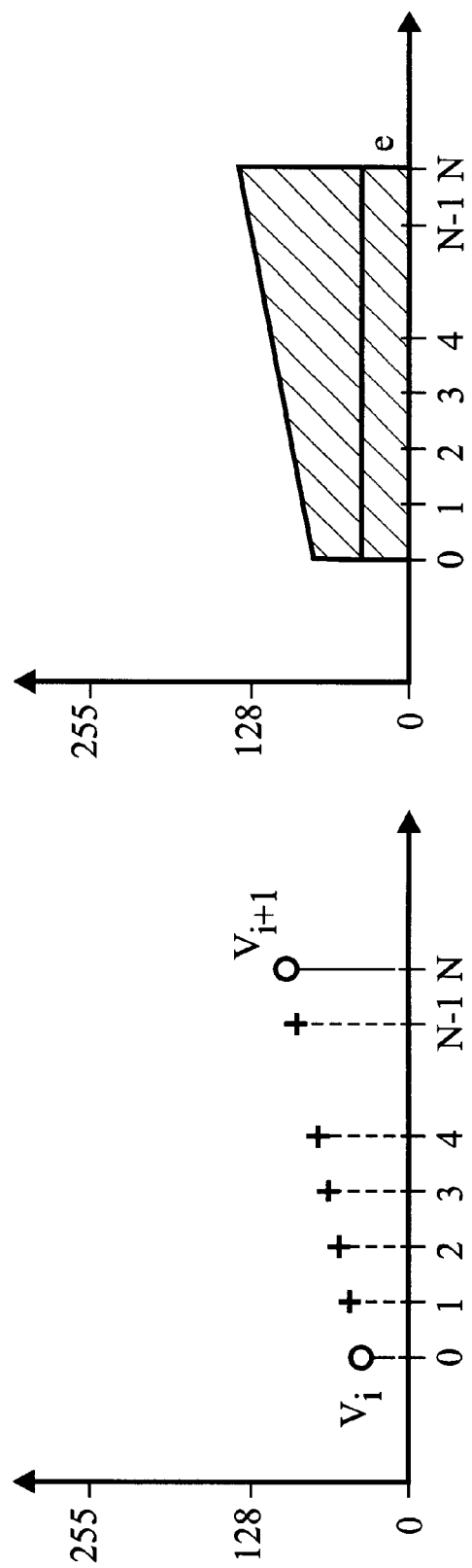
FIGS. 12A–12B show a graphical representation illustrating the interpolating of subpixel values between the obtained boundary subpixel values in parallel with the modifying of the desired output value with an error component.
Figure 14A:
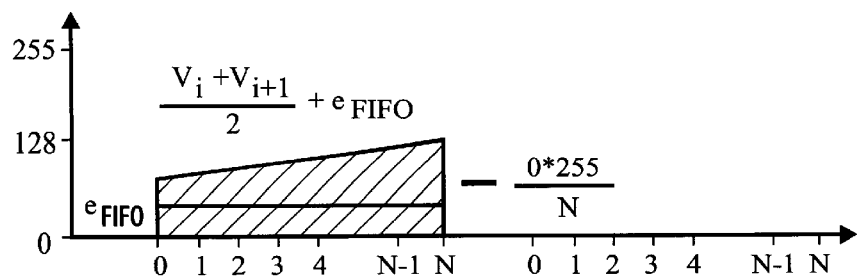
FIGS. 14A–14D show a graphical representation illustrating the calculation of a plurality of partial possible error values.
Figure 14B:
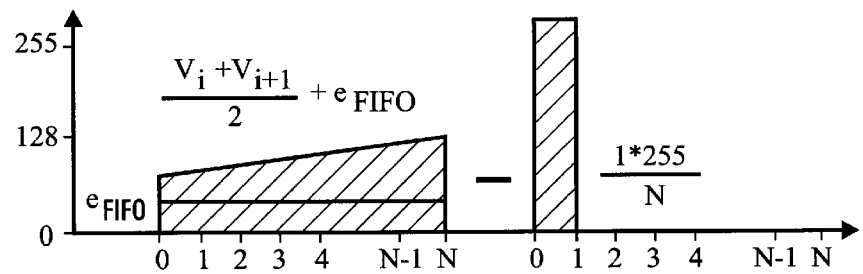
Figure 14C:
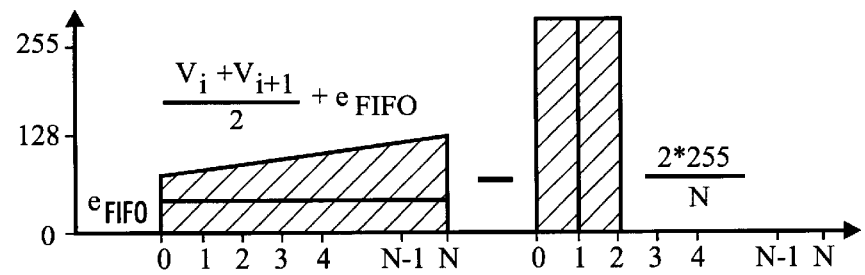
Figure 14D:
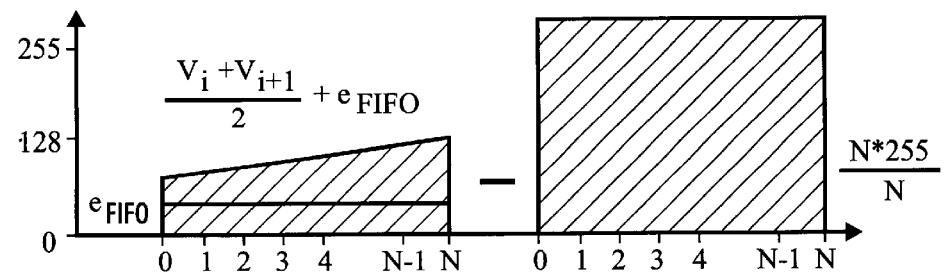

The following will be a detailed description of the drawings illustrated in the present invention. In the following description, FIGS. 11A–11B are collectively identified as FIG. 11; FIGS. 12A–12B are collectively identified as FIG. 12; FIGS. 14A–14D are collectively identified as FIG. 14; FIGS. 16A–16D are collectively identified as FIG. 16; FIGS. 27A–27D are collectively identified as FIG. 27; and FIGS. 28A–28D are collectively identified as FIG. 28.

As is well known, the error generated in an error diffusion process is equal to the desired output value minus the actual output value. For example, in a conventional error diffusion process for a white-black system wherein the "black" and "white" reference values are assumed to be 255 and 0, respectively, the error generated for a rendered black pixel is V–255, and V–0 is the error for a rendered white pixel wherein V, in both cases, is the multi-level video data value being reduced in levels by the level reducing process. Simply put, the error for a conventional error diffusion process is the original video value, V, minus the binary value (n) of the rendered pixel (1=black & 0=white) multiplied by the "black" reference value (Black) minus the "white" reference value (White): V–n (Black–White). Since the conventional system assumes a "blacke" reference value of 255 and a "white" reference value of 0, the binary value n is always multiplied by 255. As noted above, this process can produce "speckled" images if the background value is less than the "white" reference value 255 when looking at the original video data prior to inversion.

To solve this problem, the present invention utilizes the determined "black" reference value (LineBlack) and the determined "white" reference value (LineWhite) to generate the error to be propagated to adjacent pixels through the error diffusion process. The values LineBlack and LineWhite are obtained from compiling a histogram of the image being reproduced and determining the background and "black" reference values therefrom. The generation of the histogram and the determination of background and "black" reference values therefrom are well known, and thus a detail explanation of these processes will not be discussed in great detail. The white and black reference values can also be calculated in an auto-windowing environment via a "window/object" histogram. In this situation, the histogram is limited to a particular window or object, not the entire image.

For example, the histogram can be generated by conducting a first scan or pre-scan of the image to be rendered so that the frequency in which an individual image density value appears in the image can be tallied. In other words the number of pixels in the image having an image density value of 128 are counted. After conducting the count for each image density value, the background and "black" reference values are determined by looking at the maximum peaks at either end of the spectrum (0 to 255). The background value is assigned to the LineWhite value, and the "black" reference value is assigned to the LineBlack value. These values (LineWhite & LineBlack) are then used in image processing (error diffusion in the preferred embodiment) the second scanning of the image. The histogram and reference values can also be done on the fly, by compiling a histogram of the previously processed scanline and keeping a running average of the background and "black" reference values. In this system, the LineWhite and LineBlack values can be easily updated scanline by scanline.

Upon establishing the LineWhite and LineBlack values, the present invention utilizes these values to determine the error to be propagated in the error diffusion process. In other words, the error value becomes V–n (LineBlack–LineWhite). By utilizing the actual "black" and "white" reference values for the image being reproduced, the present invention can substantially eliminate the production of "specleed" images Although the present invention has been described above with respect to a conventional error diffusion process, the preferred embodiment of the present invention is the utilization of the actual "black" and "white" reference values in a high addressable error diffusion process. This preferred implementation will be discussed in more detail below.

To extend the conventional error diffusion process, described above, to a high addressability environment, the binarization (threshold) is performed at a higher spatial resolution, but the error computation and propagation is performed at the original lower spatial resolution. This splitting of the process substantially prevents or reduces the number of isolated subpixels, thereby maintaining high image quality. This high resolution/low resolution method of the present invention will be explained in more detail below.

In explaining the high addressability error diffusion process, it is assumed that the input grey levels at pixel location i and pixel location i+1 are represented by $V_i$ and $V_{i+1}$, respectively. The rendering error, at the lower resolution, that passes from upstream pixels to the downstream pixel locations is denoted by $e_i$.

It is noted that a feature of high addressability involves interpolation between pixels, the creation of subpixels. This interpolation impacts the high addressability error diffusion process. More specifically, depending on the way the interpolation is done, two distinct outputs can be obtained utilizing the high addressability error diffusion process of the present invention. Each one of these distinct outputs will be discussed below.

With respect to a first interpolation scheme, the steps for determining the printing or rendering of a subpixel are as follows Initially, the modified pixel values $P0_i=V_{i-1}+e_{i-1}$ and $P1_i=V_i+e_i$ are computed. The subpixels are denoted by 0 to N–1 wherein the high addressability characteristic is N. The high addressability characteristics is the number of subpixels that a printer can produce compared to the throughput bandwidth of the image processing system. In other words, the high addressability characteristic defined as the number of subpixels that the image output terminal can render from one pixel of image data that can be processed by the image processing system.

High addressability is important in situations where the device can process the image data at one resolution, but print at a higher resolution. In such a situation, the present invention can take advantage of a processing system designed for a lower resolution image, (lower resolution can be processed quicker and less expensively), and a printing device which, through laser pulse manipulation, can print at a higher resolution. For example, the image can be processed at 600×600×8 and printed at 2400×600×1 using the high addressability process of the present invention. In the above example, the high addressability characteristic 4. If the image was processed at 600×600×8 and printed at 1200×600×1, the high addressability characteristic would be 2.

The interpolated subpixel values are computed as $B_y=P0+y(P1-P0)/N$ for y=0 to N–1. The interpolated subpixel values are then compared with a hold value which in most cases is 128, assuming that the video value ranges from 0 to 255. If $B_y$ is greater than or equal to 128, the subpixel is turned ON; otherwise, the subpixel is turned OFF. The error to be propagated to downstream pixels, in a conventional high addressable error diffusion process, is computed as the desired output, (P0+P1)/2, minus the actual output, namely, n*255/N, wherein n is the number of subpixels turned ON.

The error is then multiplied by a set of weighting coefficients and distributed to the downstream pixels as in the first version.

More specifically, the screened inputted modified video signal is divided into N subpixel units. The P0 and P1 values are computed as noted above. The computed subpixel values are compared with a threshold value, namely 128. If the subpixel value is grater than or equal to the threshold value, the subpixel value is set to the ON state. However, if the subpixel value is less than 128, the subpixel value is set to the OFF state.

Upon completing the comparison of all subpixel values, the number of ON subpixels are calculate. Moreover, the error from the threshold process is calculated so that the value represents the original lower spatial resolution. Upon calculating the error, the error is multiplied by weighting coefficients and distributed the error to downstream pixels.

Figure 22:
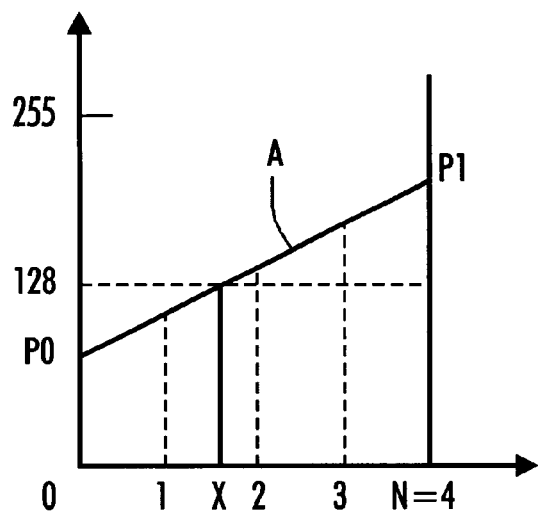
FIG. 22 shows a graph illustrating subpixel interpolation.

As noted above, the modified pixel values $P0_i=V_{i-1}+e_{i-1}=P1_{i-1}$ and $P1_i=V_i+e_i$ are computed at two locations corresponding to the input resolution. An example of this is illustrated in FIG. 22 wherein the subpixels are denoted by 0 to N−1. In FIG. 22, the high addressability characteristic, N, is equal to 4.

As illustrated in FIG. 22, a line is drawn to connect the values P0 and P1. (The i subscripts have been dropped for simplicity.) Moreover, a dotted line is drawn to represent a threshold value of 128. (Again, it is noted that 0 to 255 is the range of the video signal; however, any range can be utilized and any threshold value may be used.) The intersection of the line connecting P0 and P1 and the ie representing the threshold at 128 determines which subpixels are to be rendered or printed. The X coordinate of the point of intersection is determined and normalized to N by the equation X=N (128−P0)/(P1−P0).

Next, it is determined which subpixels are to be turned ON. If X is less than or equal to 0 and if P1 is greater than or equal to 128, all the subpixels are ON; otherwise, all the subpixels are OFF. This decision represents the complete rendering or non-rendering of the pixel. To determine a partial rendering of the whole pixel a subpixel analysis must be performed. In this instance, the value X must be compared to the individual subpixel values.

It is noted, as illustrated in FIG. 22, that the value of X does not necessarily compute to a whole number or subpixel thereby making any analysis include a fractional component. To avoid this, X is converted to a whole number or subpixel value. For this conversion, n is allowed to be equal to the truncated integer value of X. The values n and X can then be utilized to determine which subpixels are to be turned ON and which subpixels are to be turned OFF. More specifically, if X is greater than 0, but less than n, and if P1 is less than 128, only the subpixels from 0 to n are turned ON and the rest of the subpixels are turned OFF; otherwise, the subpixels from 0 to n are turned OFF and the rest are turned ON. If X is greater than or equal to n and if P0 is greater than or equal to 128, all subpixels are turned ON; otherwise, all subpixels are turned OFF.

This threshold process produces an error which needs to be propagated to downstream pixels Moreover, as noted above, the error needs to be at the original low resolution input. The conversion to the original resolution is realized by determining the difference between the desired output, (P0+P1)/2, and the actual output, namely n*255/N where n is the number of subpixels that were turned ON. The converted error is then multiplied by a set of weighting coefficients and distributed to the downstream pixels.

The second interpolation method with respect to implementing the high addressability error diffusion method of the present invention will be describe as follows.

Figure 23:
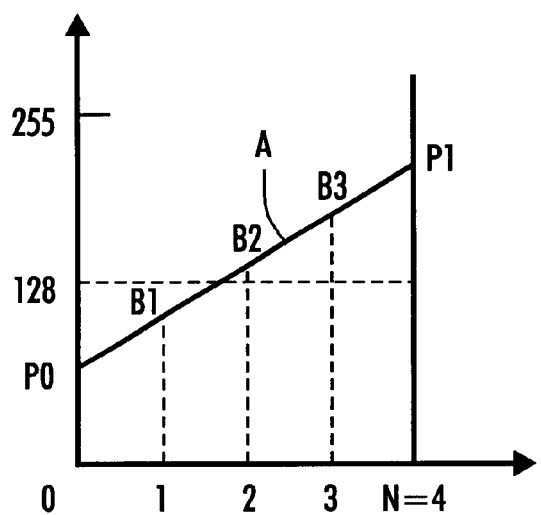
FIG. 23 shows a graph illustrating another subpixel interpolation method.

In the second interpolation method, the modified pixel values $P0_i=V_i+e_i$ and $P1_i=V_{i+1}+e_i$ are computed wherein. FIG. 23 illustrates the values P0 and P1 for the second version of the high addressability error diffusion method of the present invention.

An example of the actual architecture of the circuit used to implement the high addressability error diffusion process will be discussed below.

Figure 1:
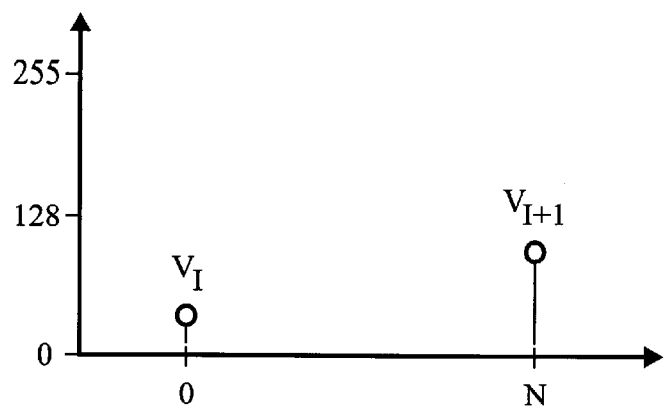
FIG. 1 shows a graphical representation of obtaining boundary subpixel values.
Figure 2:
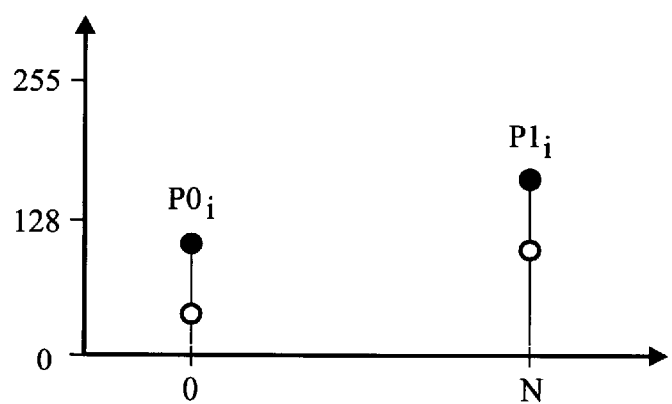
FIG. 2 shows a graphical representation of modifying the obtained boundary subpixel values with an error component.

FIGS. 1–7 illustrate the computational steps required to perform high addressability error diffusion using a particular interpolation scheme. Initially, as illustrated in FIG. 1, the pixel value $V_i$ and $V_{i+1}$ are obtained. The actual pixel values are graphically illustrated in FIG. 1, wherein the pixel value $V_i$ represents the pixel value at the subpixel position 0 and the pixel value $V_{i+1}$ represents the pixel value at the Nth subpixel. In FIG. 1, the pixel values range from 0 to 255 utilizing a conventional eight-bit dataword to represent the multi-level grey value of the image data to be processed. It is noted that any range can be utilize to represent the grey level value of the image data; for example, 0 to 511, 0 to 127, etc.

After obtaining the initial pixel values of $V_i$ and $V_{i+1}$, a diffused error component $e_i$ (the accumulated error from previous pixel binarization processes) is added to the pixel values $V_i$ and $V_{i+1}$ to obtain $P0_i$ and $P1_i$. It is noted that the error component $e_i$ consists of two components, $e_{FIFO}$ and $e_{FB}$, where $e_{FIFO}$ is the summed error component stored in a line buffer and $e_{FB}$ is the feedback error component. The adding of the error component $e_i$ is illustrated graphically in FIG. 2.

Figure 3:
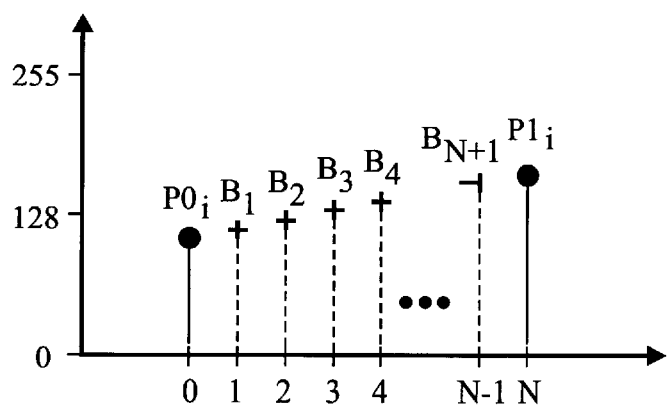
FIG. 3 shows a graphical representation of interpolating subpixel values between the modified boundary subpixel values.
Figure 4:
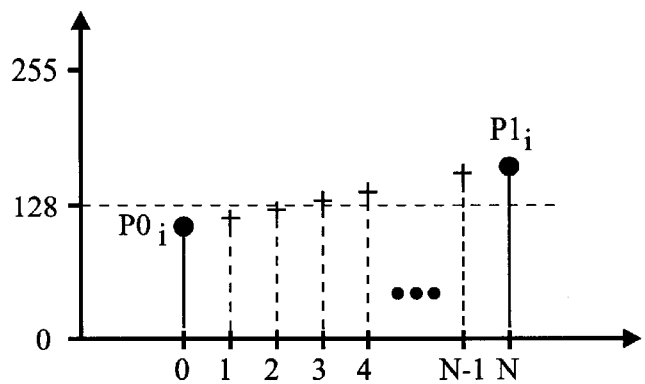
FIG. 4 shows a graphical representation of comparing the interpolated subpixel values with a threshold value.
Figure 5:
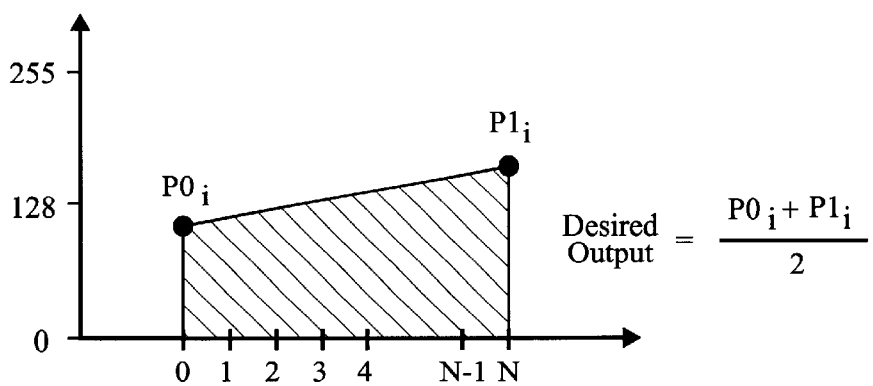
FIG. 5 shows a graphical representation of computing a desired output value.

After adding the diffused error component, the interpolated subpixel values are computed, as illustrated in FIG. 3. For example, the interpolated subpixel values are $B_y=P0+y(P1_i-P0_i)/N$ for y=1 to N−1, where N is the selected high addressability characteristic. It is noted that the value $P0_i$ is equal to $V_i+e_i$ and $P1_i$ equal to $V_{i+1}+e_i$.

After computing the interpolated subpixel values, each interpolated subpixel value is compared to a threshold level. In the example illustrated in FIG. 4, the threshold value is 128. It is noted that this threshold value can be any value within the range of the image data depending upon the desired results. In this example, each subpixel which has a value greater than or equal to 128 is set ON.

Figure 6:
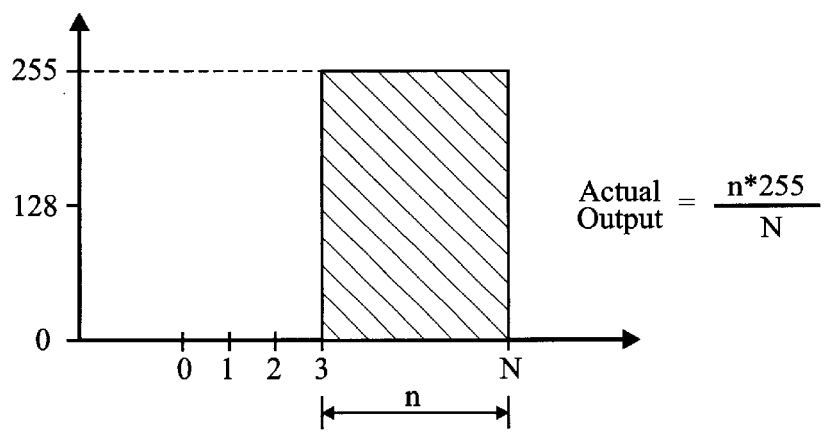
FIG. 6 shows a graphical representation of computing an actual output value.

Next, the desired output $(P0_i+P1_i)/2$ is computed. This computing of the desired output is graphically illustrated in FIG. 5. After computing the desired output, the actual output is computed. In this example, the actual output is equal to n*255/N where n is the number of subpixels that have been turned ON as the result of the comparison illustrated in FIG. 10. A graphical representation of the computed actual output is shown in FIG. 6. Once the desired output and the actual output have been computed, the error diffusion method computes the error to be propagated downstream. This error is computed as the desired output minus the actual output. A graphical representation of this computation is shown in FIG. 7.

Figure 7:
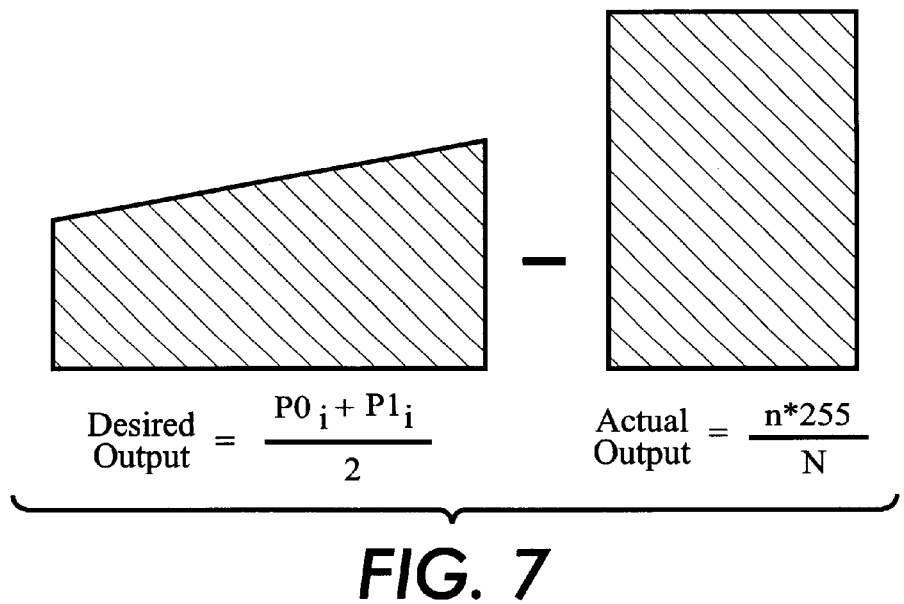
FIG. 7 shows a graphical representation of computing an error value to be propagated to downstream pixels.
Figure 8:
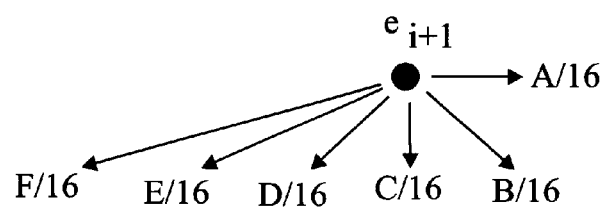
FIG. 8 shows a graphical representation illustrating actual distribution of the error in a typical error distribution routine.
Figure 9:
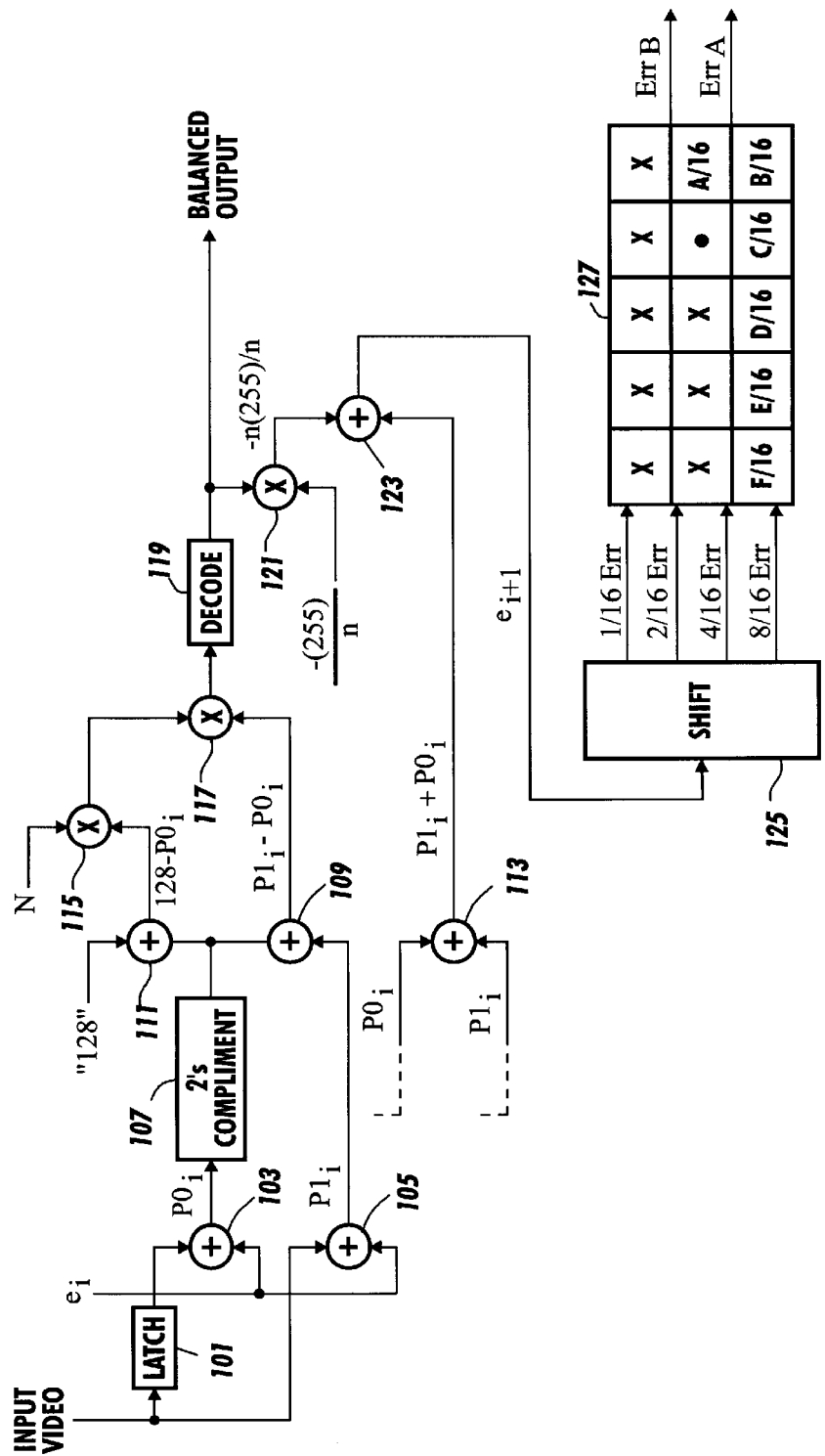
FIG. 9 shows a block diagram illustrating one embodiment of the present invention implementing a high addressability error diffusion process.

As illustrated in FIG. 7, the error is calculated to be $e_{i+1}=(P0_i+P1_i)/2-(n*255/N)$. In this instance, the error $e_{i+1}$ represents the error from the present binarization process. As in all conventional error diffusion processes, the error from the binarization process is distributed to downstream pixels. The distributing of the error $e_{i+1}$ to downstream pixels is illustrated in FIG. 8. In this example, the distribution of error utilizes a set of error diffusion coefficients which allow fast processing by simple bit shifting. FIG. 8 illustrates the coefficients associated with each pixel location FIG. 9 illustrates a block diagram of a circuit which carries out the routine described above. In FIG. 9, the input video signal is split and latched in latch 101 so as to produce the pixel values $V0_i$ and $V1_i$. $V0_i$ represents the latched input video signal V1 as noted above, and $V0_i$ represents the pixel value just proceeding the pixel value $V1_i$ in the same scanline. The pixel value $V0_i$ is fed into an adder 103 with the error component $e_i$. Moreover, the error component $e_i$ is fed into an adder 105 along with the input video signal $V1_i$. The adder 103 produces an output signal $P0_i$ which is fed into a 2's compliment circuit 107 to produce negative $P0_i$. Negative $P0_i$ is fed into an adder 109 along with the value $P1_i$ to produce the value of $P1_i-P0_i$. Negative $P0_i$ is also fed into adder 111 which is summed with the threshold value. In this example, the threshold value is 128.

The sum from adder 111 is fed into multiplier 115 so that the value $(128-P0_i)$ can be multiplied by the high addressability characteristic value N. The Malting product is then divided by the sum from adder 109 by a divider circuit 117. The resulting quotient is fed into a decoder 119. The actual function of decoder 119 is graphically illustrated in FIG. 10.

Figure 10:
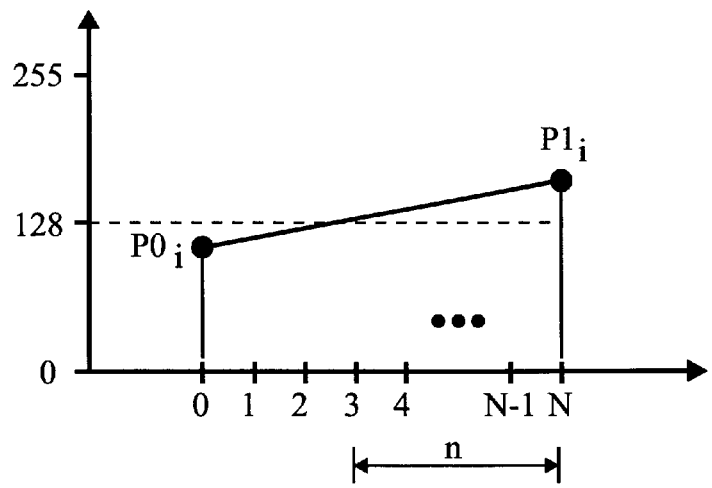
FIG. 10 shows a graphical representation illustrating a decoding process illustrated in FIG. 9.

More specifically, the decoder 119, as illustrated in FIG. 10, determines the intersection of the $P0_i/P1_i$ line and the value 128. From the determination of this intersection, the decoder 119 determines the number of subpixels n which are turned ON. The results from decoder 119 are fed as binarized output to a print engine and also to a multiplier 121. Multiplier 121 multiplies the output from decoder 119 with the value $(-255/N)$. The product of multiplier 121 is added to a sum generated by an adder 113 in adder 123. Adder 113 adds the values $P0_i$ and $P1_i$ to produce the value $P1_i+P0_i$.

The results of adder 123 represents the error component $e_{i+1}$ which is fed into a simple bit shifting circuit 125 to produce various error values that will be utilized in the distribution process. The error values generated by the bit shifting circuit 125 are fed into an error distribution circuit 127, wherein half the error $Err_A$ is distributed to the next pixel in the same scanlite and the other half of the error $Err_B$ is distributed to various pixels in the next scanline according to the weighting coefficients established in the error distribution circuit 127.

FIG. 11 illustrates two parallel computations which are carried out in the high addressable error diffusion. More specifically, FIG. 11 illustrates that the pixel values $V_i$ and $V_{i+1}$ are obtained in parallel to the beginning of the computation of the desired output for a single subpixel wherein the desired output is computed without including the diffused error components $e_{FIFO}$ or $e_{FB}$.

After these parallel computations are completed, the preferred embodiment of the present invention computes interpolated subpixel values in the same way as illustrated in FIG. 3. However, in parallel with this computation of the interpolated subpixel values, the desired output is continued to be computed by adding the error component $e_{FIFO}$. This is graphically represented in FIG. 12.

Figure 13:
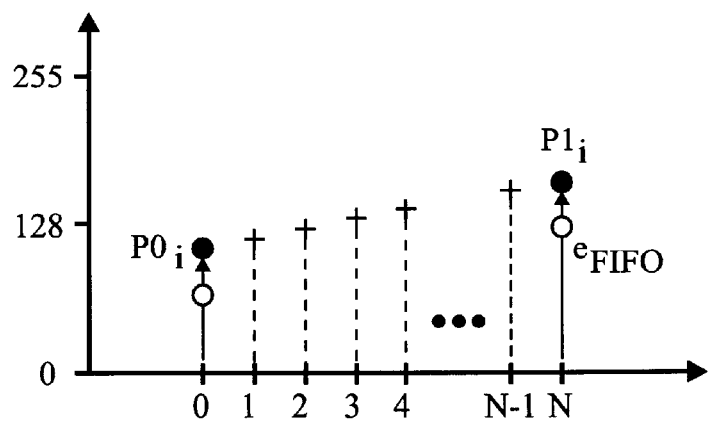
FIG. 13 shows a graphical representation illustrating the modifying of the subpixel values between the obtained boundary subpixel values with an error component.

Next, the error component $e_{FIFO}$ is added to the pixel values $V_i$ and $V_{i+1}$ and the interpolated subpixels as illustrated in FIG. 13. At the same time (in parallel thereto), all possible actual subpixel outputs are subtracted from the desired output without including the diffused error component $e_{FB}$. In other words, N possible actual subpixel outputs are subtracted from the desired output computed in FIG. 12 to produce N possible error outputs $e_p$ (the desired output minus the actual output is equal to the error $e_p$). The computations illustrated in FIG. 13 are carried out in parallel with the computations illustrated in FIG. 14.

Figure 15:
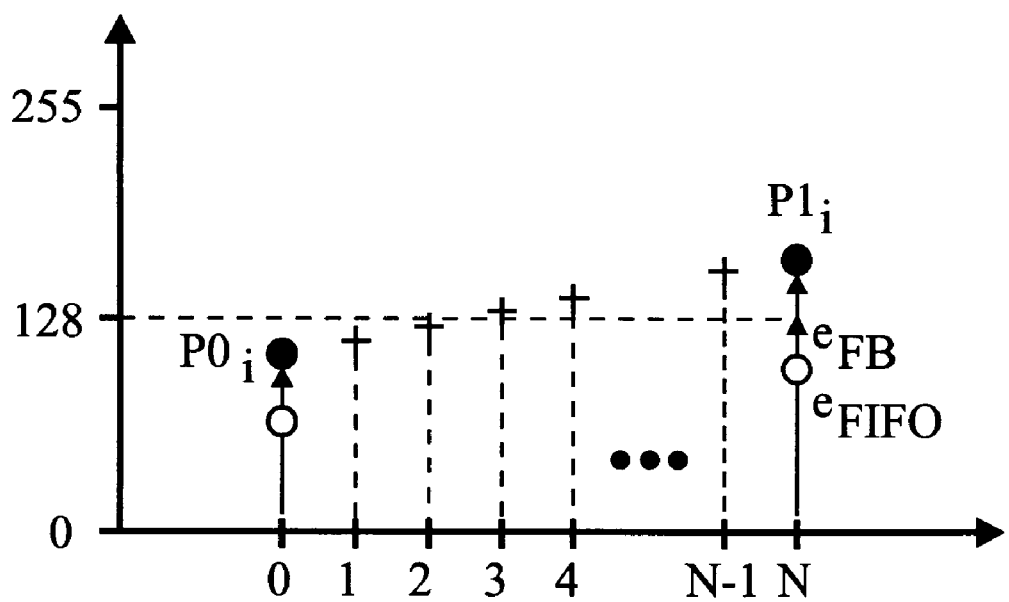
FIG. 15 shows a graphical representation of further modifying the modified subpixel values of FIG. 11 with another error component.
Figure 16A:
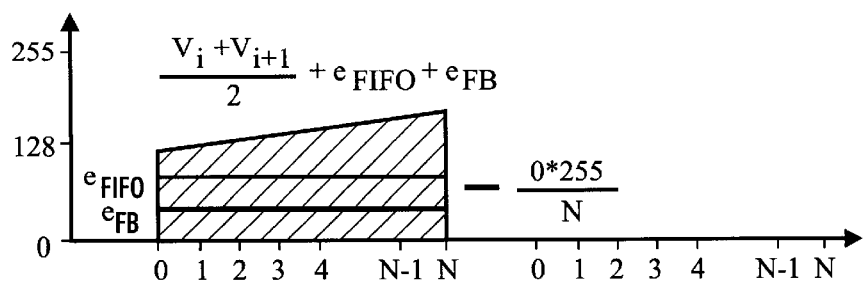
FIGS. 16A–16D show a graphical representation illustrating the calculation of a plurality of complete possible error values.
Figure 16B:
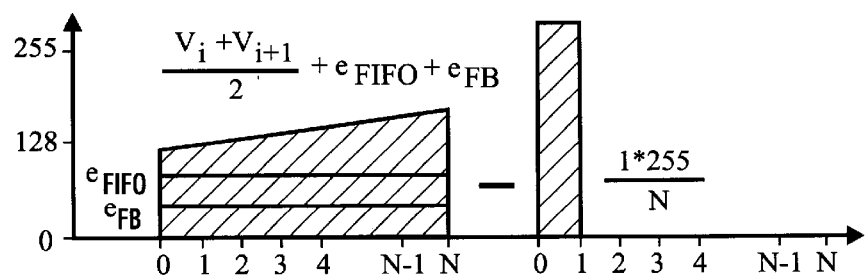
Figure 16C:
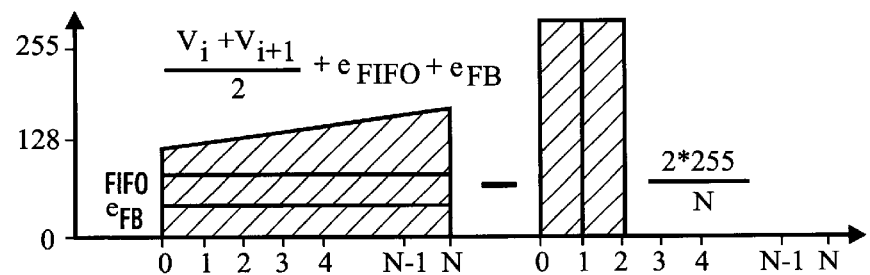
Figure 16D:
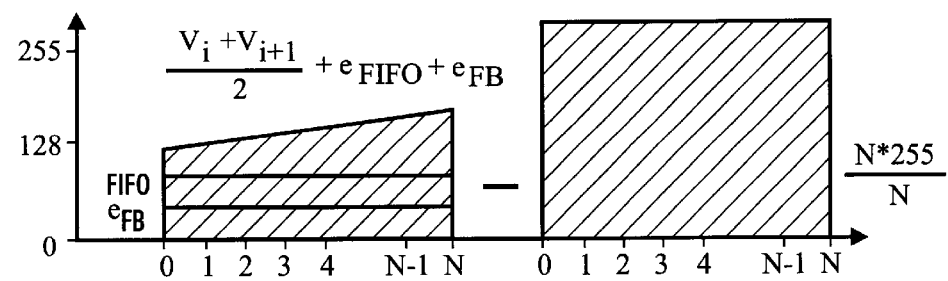

The error component $e_{FB}$ is added to the pixel values $V_i$, $V_{i+1}$, and the various interpolated subpixel values as illustrated in FIG. 15. At the same time that the feedback error component $e_{FB}$ is being added in FIG. 15, the error component $e_{FB}$ is added to all possible subpixel desired outputs as illustrated in FIG. 16. In other words, the error component $e_{FB}$ is individually added to all N error results ($e_p$) stemming from the calculations illustrated by FIG. 14.

Figure 17:
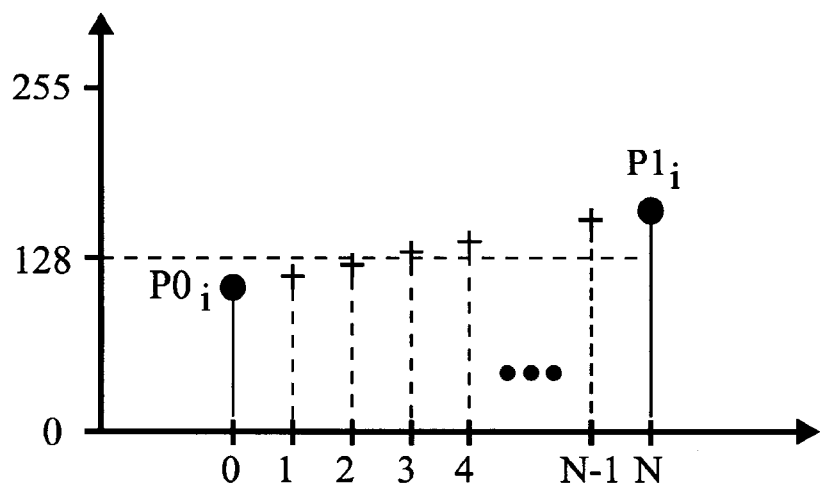
FIG. 17 shows a graphical representation of thresholding the further modified subpixel values.
Figure 18:
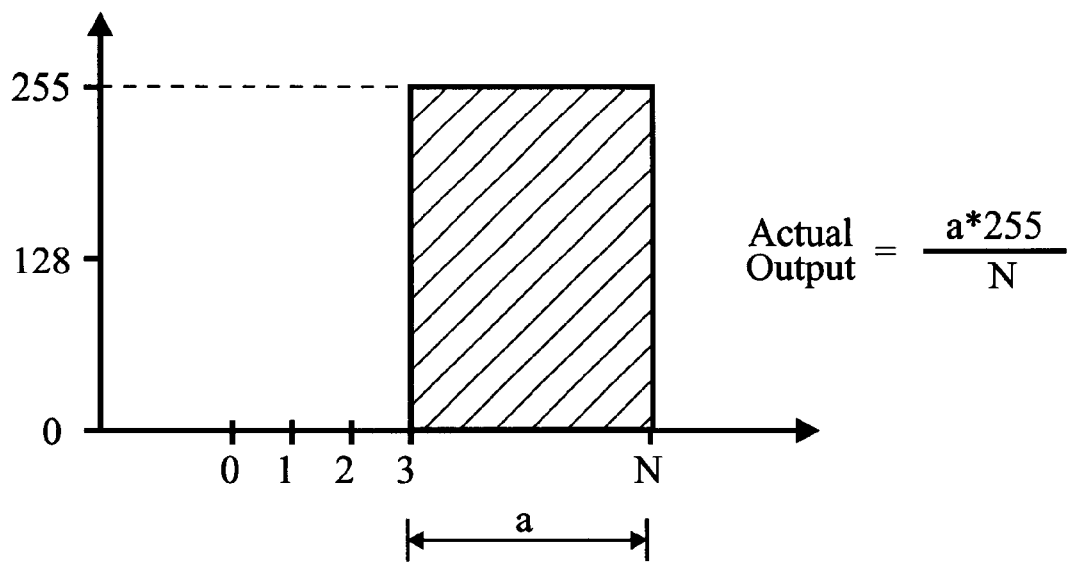
FIG. 18 shows a graphical representation of determining of number of subpixels exceeding or equal to a threshold value.
Figure 19:
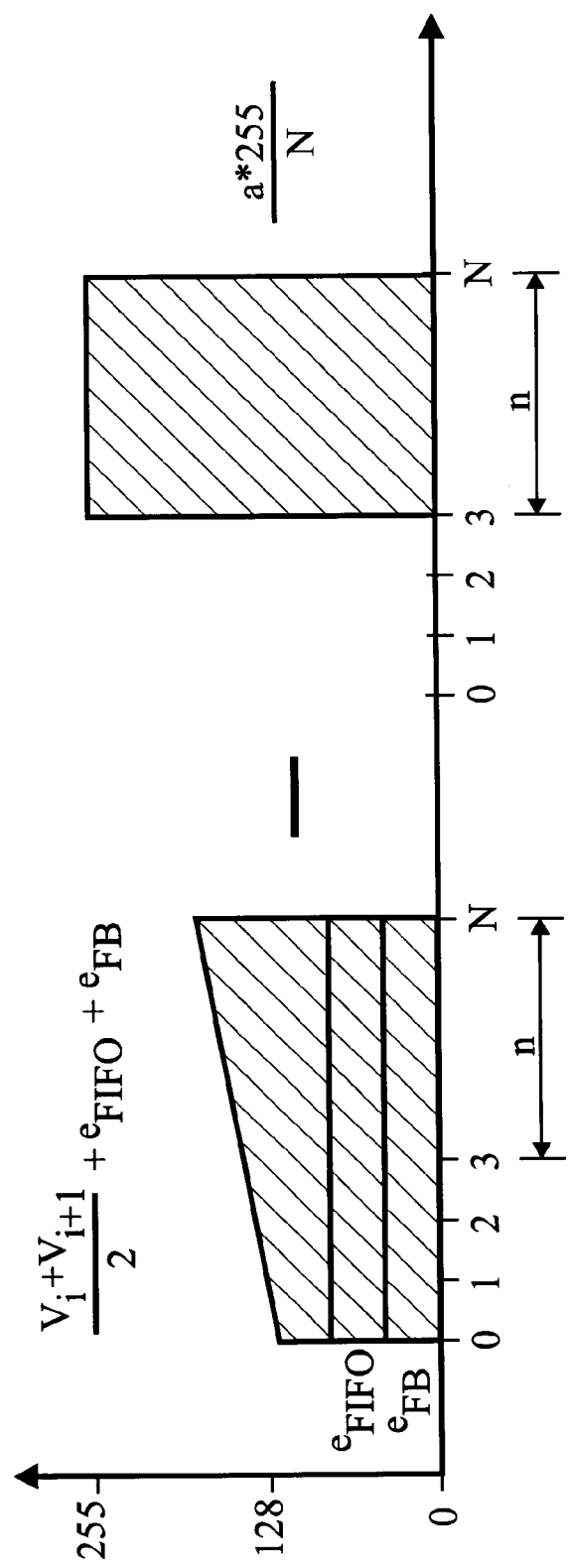
FIG. 19 shows a graphical representation of selecting one of the plurality of possible complete error values.

After completing these parallel computations, the next step includes the computations illustrated in FIGS. 17, 18, and 19. In this next step, each interpolated subpixel value is compared to a threshold value of 128, and the subpixels having a value greater than or equal to the threshold value are turned ON. This process is graphically illustrated in FIGS. 17 and 18 wherein FIG. 17 shows the comparison of the interpolated subpixel values with the threshold values, and FIG. 18 shows the turning ON of the subpixels which have a value greater than or equal to the threshold value.

Since all the possible error values were made simultaneously available as a result of the computations illustrated in FIG. 16, the error to be propagated downstream can now be immediately selected; ie., via a multiplexer, based upon the number of subpixels which are turned ON. In other words, FIG. 19 illustrates the properly selected error value from the various simultaneously available error values produced by the computations illustrated in FIG. 16. The selected error value is then distributed to downstream pixels utilizing any conventional error diffusion technique.

Figure 20:
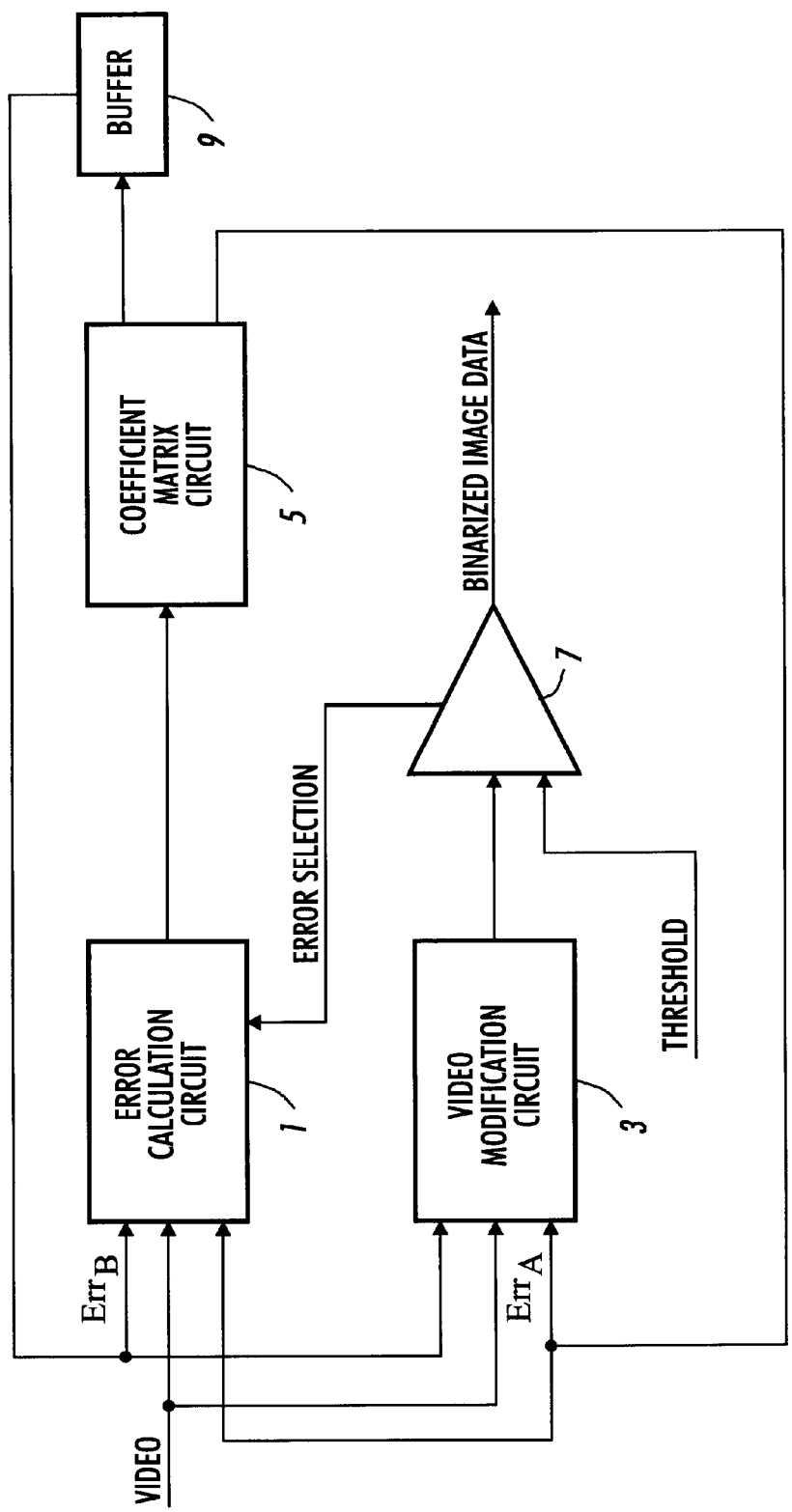
FIG. 20 is a block diagram illustrating implementation of the processes illustrated in FIGS. 11–19.

FIG. 20 illustrates a functional block diagram of the parallel pipeline high addressability error diffusion circuit. In FIG. 20, the input video signal is fed into an error calculation circuit 1 and a video modification circuit 3. The error components $e_{FIFO}$ ($Err_B$) and $e_{FB}$ ($Err_A$) are also fed into the error calculation circuit 1. The error calculation circuit calculates all the various possible error values that can result from the presently occurring binarization process. The selection of the proper error to be output by the error calculation circuit 1 is based upon the received error selection signal which will be discussed in more detail below.

The selected error value from the error calculation circuit 1 is fed into a coefficient matrix circuit which distributes the error based upon a set of weighting coefficients. The coefficient matrix circuit 5 splits the error values into the two components $e_{FIFO}$ ($Err_B$) and $e_{FB}$ ($Err_A$). As noted before, the feedback error, $Err_A$, is fed back to the video modification circuit 3 and the error calculation circuit 1 from the coefficient matrix circuit 5. The video modification circuit 3 also receives the $Err_B$ from buffer 9.

The video modification circuit 3 produces the interpolated subpixel values for the high addressability error diffusion method wherein the interpolated subpixel values are fed into the binarization circuit 7 along with a threshold value. In the preferred embodiment of the present invention, the threshold value is 128. However, it is noted that this threshold value can be any value.

The binarization circuit 7 binarizes the inputted video data so as to output binarized image data for the utilization by an image rendering device. The binarization circuit 7 also produces the error selection signal which is utilized by the error calculation circuit 1 to choose the correct error value to be fed to the coefficient matrix circuit 5. This error selection signal represents the number of interpolated subpixels which are turned ON during the binarization process.

Thus, the error cation circuit 1 may include a multiplexer to make this selection.

As illustrated in FIG. 20, the error calculation circuit 1 is in parallel with the video modification circuit and the binarization circuit. Moreover, the high addressability error diffusion architecture of the present invention is implemented on an ASIC, thereby enabling hardware implementation so that the image data can be binarized within the time constraints and throughput specifications of a high speed image rendering device.

Figure 21:
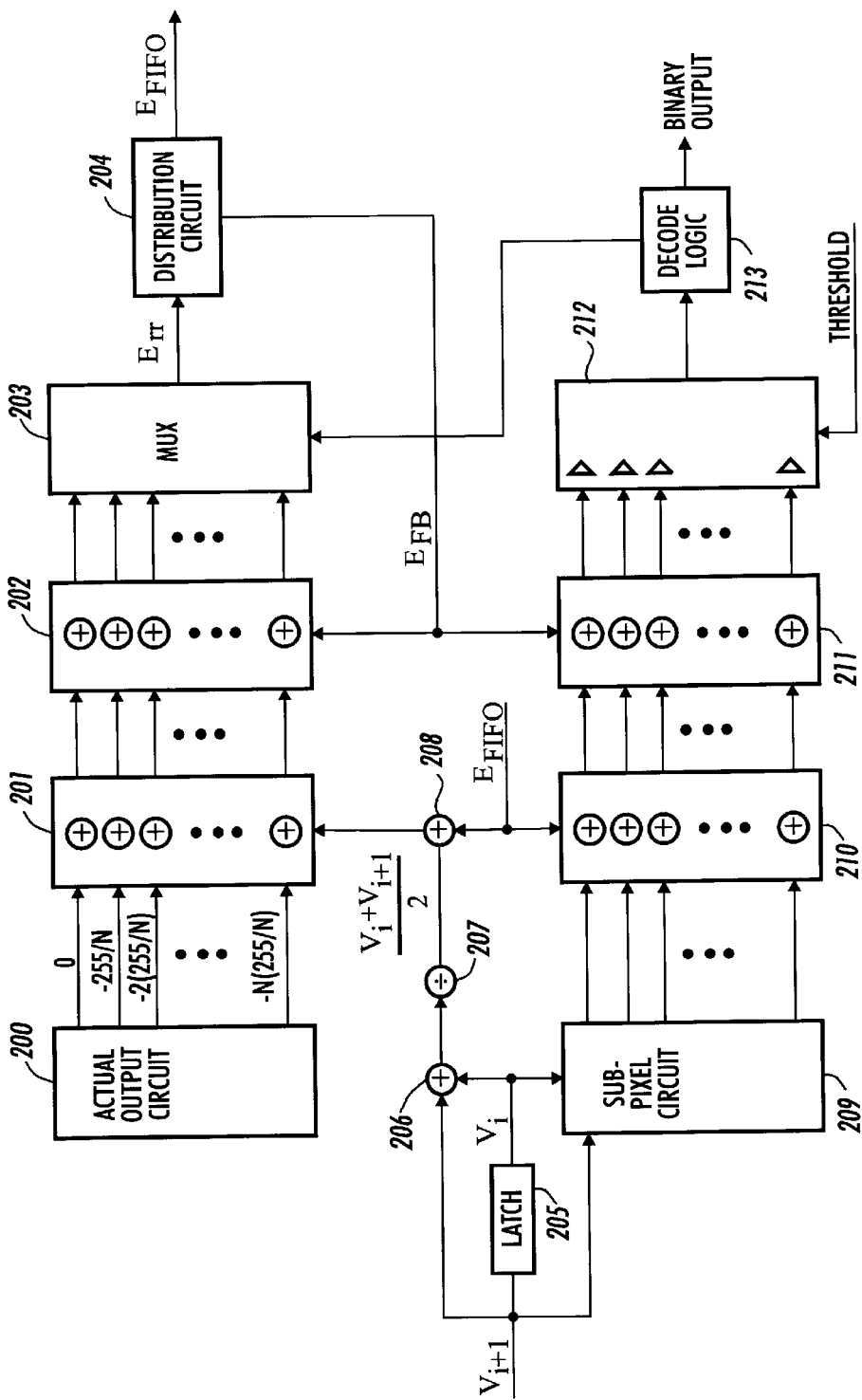
FIG. 21 is a block diagram illustrating circuitry implementation of the processes illustrated in FIGS. 11–19.

FIG. 21 illustrates a detail block diagram of the circuit corresponding to FIG. 20. As illustrated in FIG. 21, many of the computations, as previously described with respect to FIGS. 115 19, are carried out in parallel.

Pixel values $V_i$ and $V_{i+1}$ are obtained by the utilization of a latch 205 which latches the video signal so that two adjacent fastscan pixels are available for processing. The pixel values $V_i$ and $V_{i+1}$, are summed in adder 206 and the sum is divided in half by divider 207. The result from divider 207 is fed into adder 208 with the error term $e_{FIFO}$. The sum represents the desired output to the printer.

In parallel to the above described process, an actual output generation circuit 200 produces all possible outputs to the printer based on the high addressability characteristic. It is noted that these values are negative since an adder is used for subtraction operations. If the high addressability characteristic is N, N possible actual outputs will be generated. Also in parallel to the above described process, a subpixel circuit 209 generated all the interpolated subpixels based on the screened pixel values $V_i$ and $V_{i+1}$.

Next, the error component $e_{FIFO}$ is added to each of the interpolated subpixels by adder 210. At the same time (in parallel thereto), each possible actual outputs (negative values) is individually added to the desired output by adder 201. In other words, N possible actual subpixel outputs are subtracted from the desired output to produce N possible error outputs.

In adders 211 and 202, a feedback error term $e_{FB}$ is added to each summation from adders 210 and 201, respectively. These computations are carried out in parallel. After completing these parallel computations, each interpolated subpixel from adder 211 is compared to a threshold value in threshold circuit 212. The subpixels having a value greater than or equal to the threshold value are turned ON. Threshold circuit outputs a number representing the number of sub pixels turned ON. This information is fed into a decode logic circuit which produces a binary therefrom to be sent to a printer.

Moreover, the error terms from adder 202 are fed into a multiplexer 203 which chooses which error term to propagate to downstream pixels. The error term is selected based on a control signal received from the decode logic circuit 213. The selected error term is fed into a distribution circuit 204 which produces the next feedback error and the error to be stored in a buffer for utilization in the processing of the next scanline.

It will now be explained, in more detail, the incorporation of the concepts of the present invention into a high addressability error diffusion process with the explanation of FIGS. 24–32 below.

Figure 24:
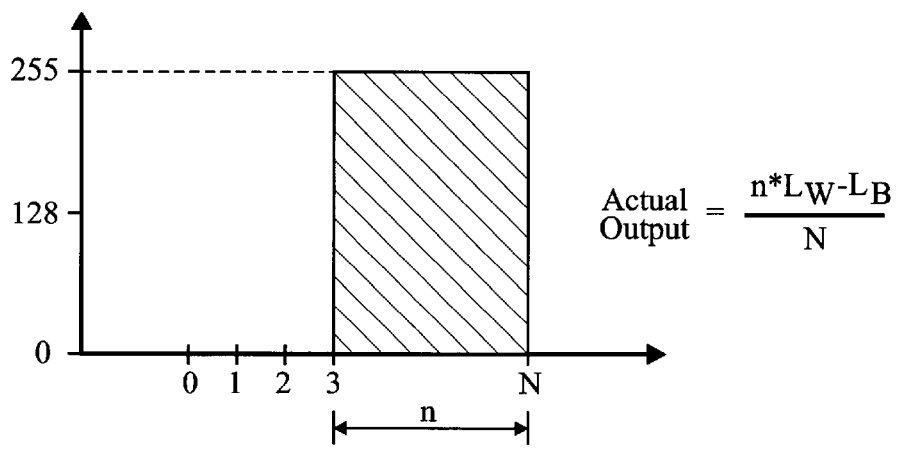
FIG. 24 shows a graphical representation of computing an actual output value according to the concepts of the present invention.
Figure 25:
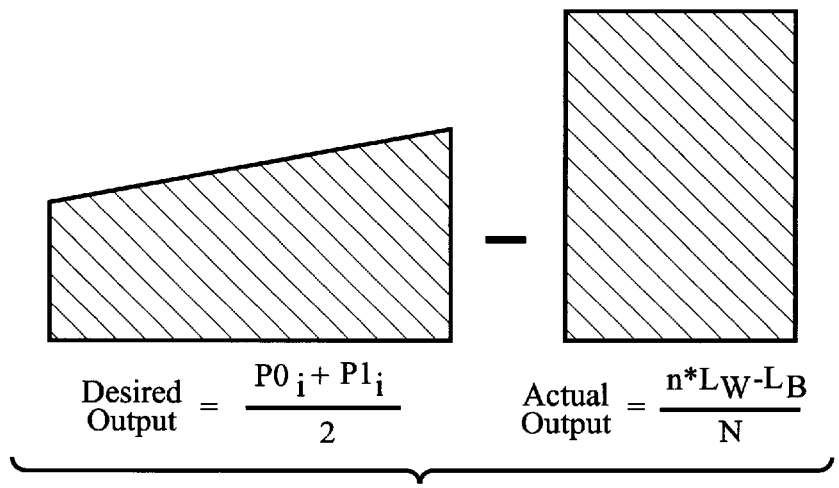
FIG. 25 shows a graphical representation of computing an error value to be propagated to downstream pixels according to the concepts of the present invention.

One embodiment of the present invention uses the basic process described above with respect to FIGS. 1–8, except that in lieu the processes illustrated in FIGS. 6 and 7, the present invention utilizes the process illustrated in FIGS. 24 and 25. More specifically, when the high addressability error diffusion process of the present invention determines the actual output value as illustrated in FIG. 24, this value is calculated as n*(LineBlack−LineWhite)/N; wherein n is the number of subpixels turned ON, LineBlack is the "black" reference value found by the histogram process, LineWhite is the background reference value found by the histogram process, and N is the high addressability characteristic. Moreover, when the high addressability error diffusion process of the present invention determines the error value for the level reduction process as illustrated in FIG. 25 (in the preferred embodiment, this is a binarization process), this value is calculated as $(P0_i-P1_i)/2-n*(LineBlack-LineWhite)/N$; wherein $P0_i$ is the first pixel value calculated for the subpixel interpolation routine, $P1_i$ is the second pixel value calculated for the subpixel interpolation routine, n is the number of subpixels turned ON, LineBlack is the "black" reference value found by the histogram process, LineWhite is the background reference value found by the histogram process, and N is the high addressability characteristic.

Figure 26:
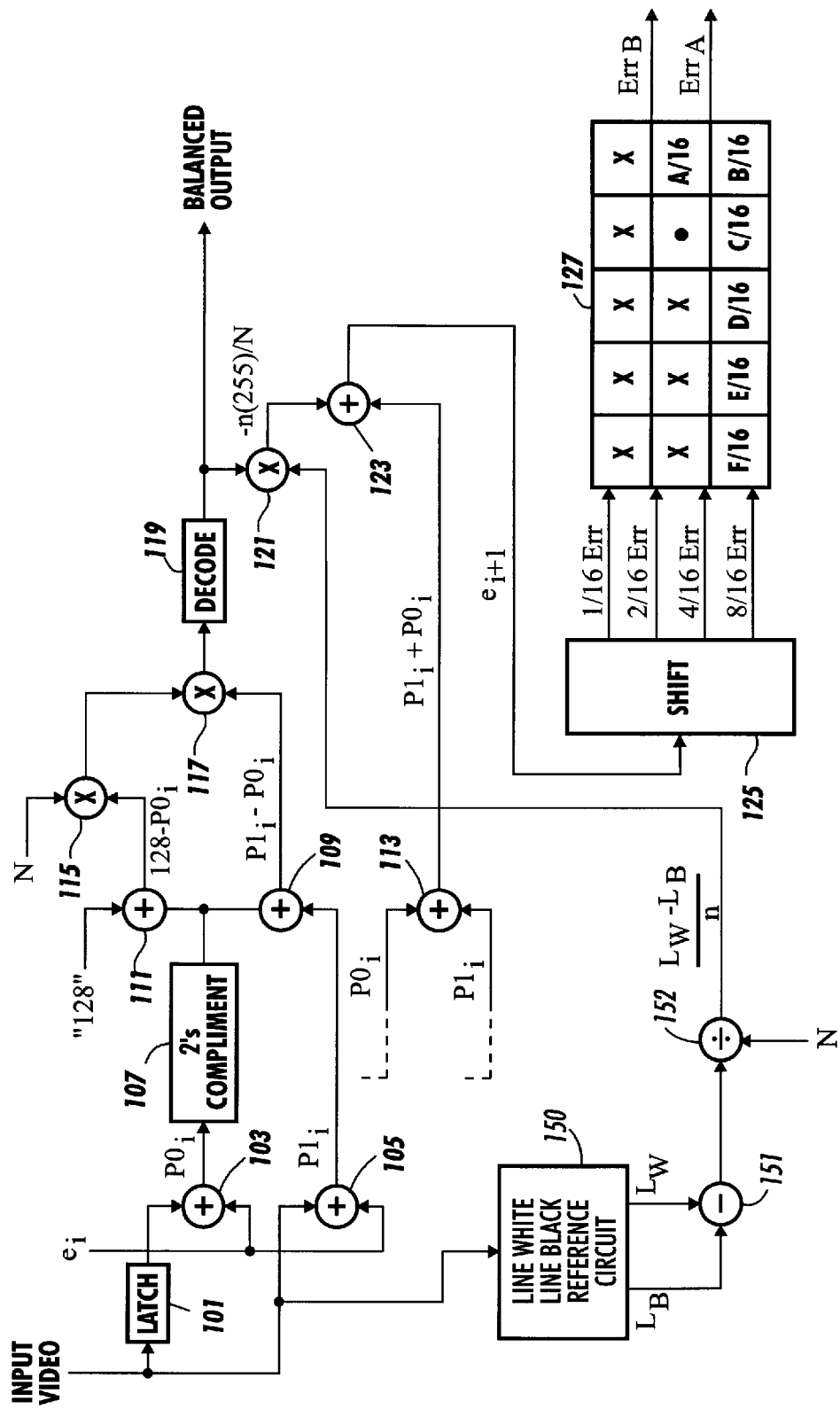
FIG. 26 shows a block diagram illustrating one embodiment of the present invention implementing a high addressabitiy error diffusion process according to the concepts of the present invention.
Figure 27A:
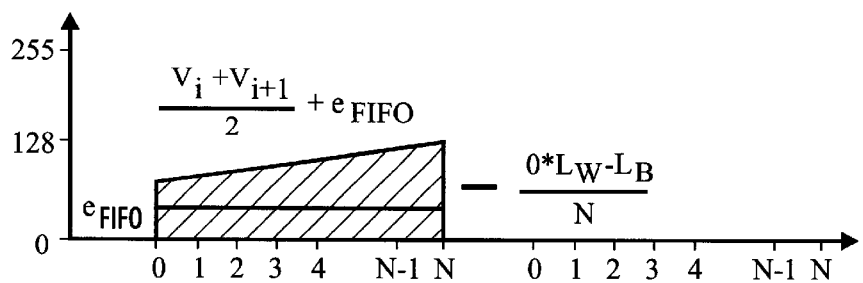
FIGS. 27A–27D show a graphical representation illustrating the calculation of a plurality of partial possible error values according to the concepts of the present invention.
Figure 27B:
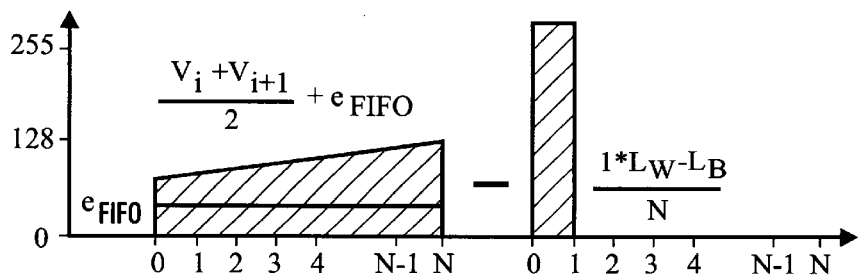
Figure 27C:
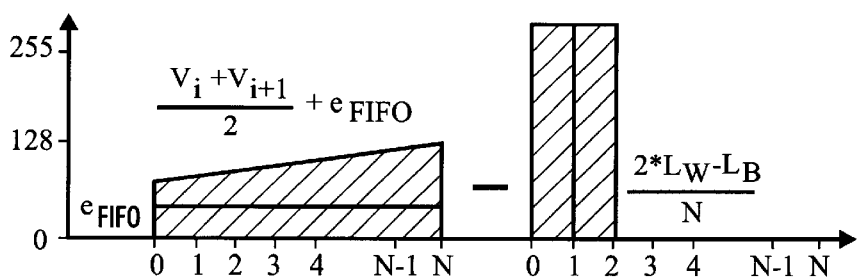
Figure 27D:
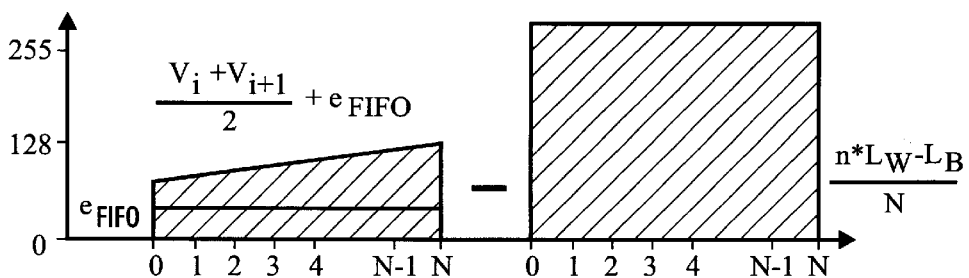
Figure 28A:
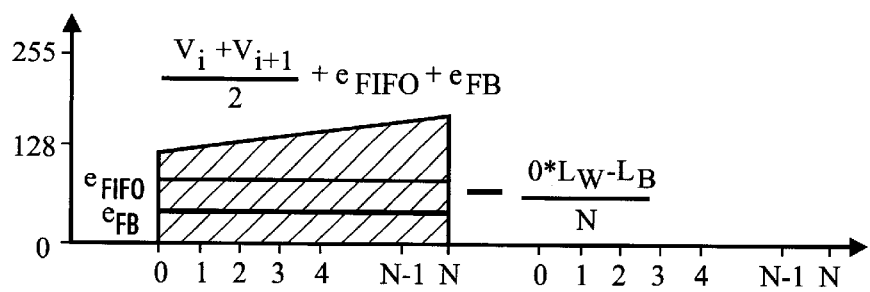
FIGS. 28A–28D show a graphical representation of further modifying the modified subpixel values of FIG. 27 with another error component according to the aspects of the present invention.
Figure 28B:
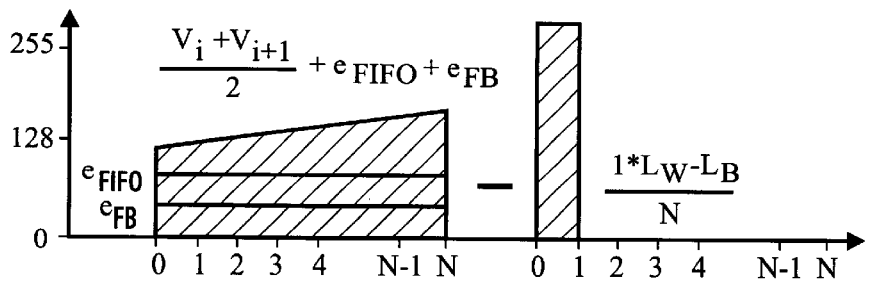
Figure 28C:
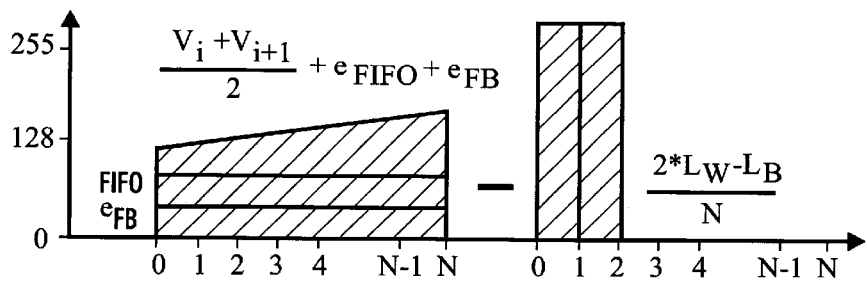
Figure 28D:
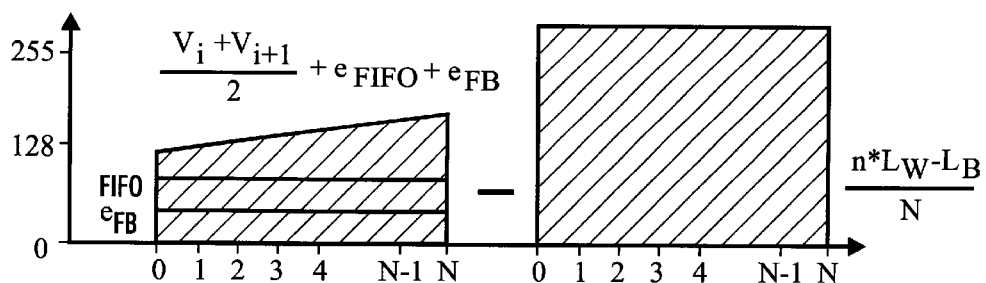

FIG. 26 illustrates a block diagram of a circuit which carries out the routine of the present invention as described above. In FIG. 26, the input video signal is split and latched in latch 101 so as to produce the pixel values $V0_i$ and $V1_i$. The input video signal is also fed to LineWhite, LineBlack reference value generating circuit 150 which utilizes conventional histogram techniques to determine the values LineBlack and LineWhite. The values LineBlack and LineWhite are fed to a subtraction circuit 151 and the difference therefrom is fed to a divider to produce the value (LineBlack−LineWhite)/N. The value (LineBlack−LineWhite)/N is fed to multiplier 121.

$V0_i$ represents the latched input video signal V1 as noted above, and $V0_i$ represents the pixel value just proceeding the pixel value $V1_i$ in the same scanline. The pixel value $V0_i$ is fed into an adder 103 with the error component $e_i$. Moreover, the error component $e_i$ is fed into an adder 105 along with the input video signal $V1_i$. The adder 103 produces an output signal $P0_i$ which is fed into a 2's compliment circuit 107 to produce negative $P0_i$. Negative $P0_i$ is fed into an adder 109 along with the value $P1_i$ to produce the value of $P1_i-P0_i$. Negative $P0_i$ is also fed into adder 111 which is summed with the threshold value. In this example, the threshold value is 128.

The sum from adder 111 is fed into multiplier 115 so that the value $(128-P0_i)$ can be multiplied by the high addressability characteristic value N. The resulting product is then divided by the sum from adder 109 by a divider circuit 117. The resulting quotient is fed into a decoder 119. The actual function of decoder 119 is graphically illustrated in FIG. 10.

More specifically, the decoder 119, as illustrated in FIG. 10, determines the intersection of the $P0_i-P1_i$ line and the value 128. From the determination of this intersection, the decoder 119 determines the number of subpixels n which are turned ON. The results from decoder 119 are fed as binarized output to a print engine and also to a multiplier 121. Multiplier 121 multiplies the output from decoder 119 with the value (LineBlack−LineWhite)/N. The product of multiplier 121 is added to a sum generated by an adder 113 in adder 123. Adder 113 adds the values $P0_i$ and $P1_i$ to produce the value $P1_i+P0_i$.

The results of adder 123 represents the error component $e_{i+1}$ which is fed into a simple bit shifting circuit 125 to produce various error values that will be utilized in the distribution process. The error values generated by the bit shifting circuit 125 are fed into an error distribution circuit 127, wherein half the error $Err_A$ is distributed to the next pixel in the same scanline and the other half of the error $Err_B$ is distributed to various pixels in the next scanline according to the weighting coefficients established in the error distribution circuit 127.

Another embodiment of the present invention uses the basic process described above with respect to FIGS. 10–19, except that in lieu the processes illustrated in FIGS. 14, 16, 18, and 19, the present invention utilizes the process illustrated in FIGS. 27, 28, 24, and 25, respectively. More specially, when the high addressability error diffusion process of the present invention determines the plurality of potential error values with the modification of the video signal with the FIFO stored error as shown in FIG. 27, the actual output value is calculated as n*(LineBlack−LineWhite)/N; wherein n is the number of subpixels turned ON, LineBlack is the "black" reference value found by the histogram process, LineWhite is the background reference value found by the histogram process, and N is the high addressability characteristic. Moreover, when the high addressability error diffusion process of the present invention determines the plurality of potential error values with the further modification of the video signal with the feedback error as shown in FIG. 28, the actual output value is calculated as n*(LineBlack−LineWhite)/N; wherein n is the number of subpixels turned ON, LineBlack is the "black" reference value found by the histogram process, LineWhite is the background reference value found by the histogram process, and N is the high addressability characteristic.

Furthermore, when the high addressability error diffusion process of the present invention determines the actual output value as illustrated in FIG. 24, this value is calculated as n*(LineBlack−LineWhite)/N; wherein n is the number of subpixels turned ON, LineBlack is the "black" reference value found by the histogram process, LineWhite is the background reference value found by the histogram process, and N is the high addressability characteristic. Lastly, when the high addressability error diffusion process of the present invention further determines the error value for the level reduction process as illustrated in FIG. 25 (in the preferred embodiment, this is a binarization process), this value is calculated as $(P0_i-P1_i)/2-n*(BnelBack-LineWhite)/N$; wherein $P0_i$ is the first pixel value calculated for the subpixel interpolation routine, $P1_i$ is the second pixel value calculated for the subpixel interpolation routine, n is the number of subpixels turned ON, LineBlack is the "black" reference value found by the histogram process, LineWhite is the background reference value found by the histogram process, and N is the high addressability characteristic.

Figure 29:
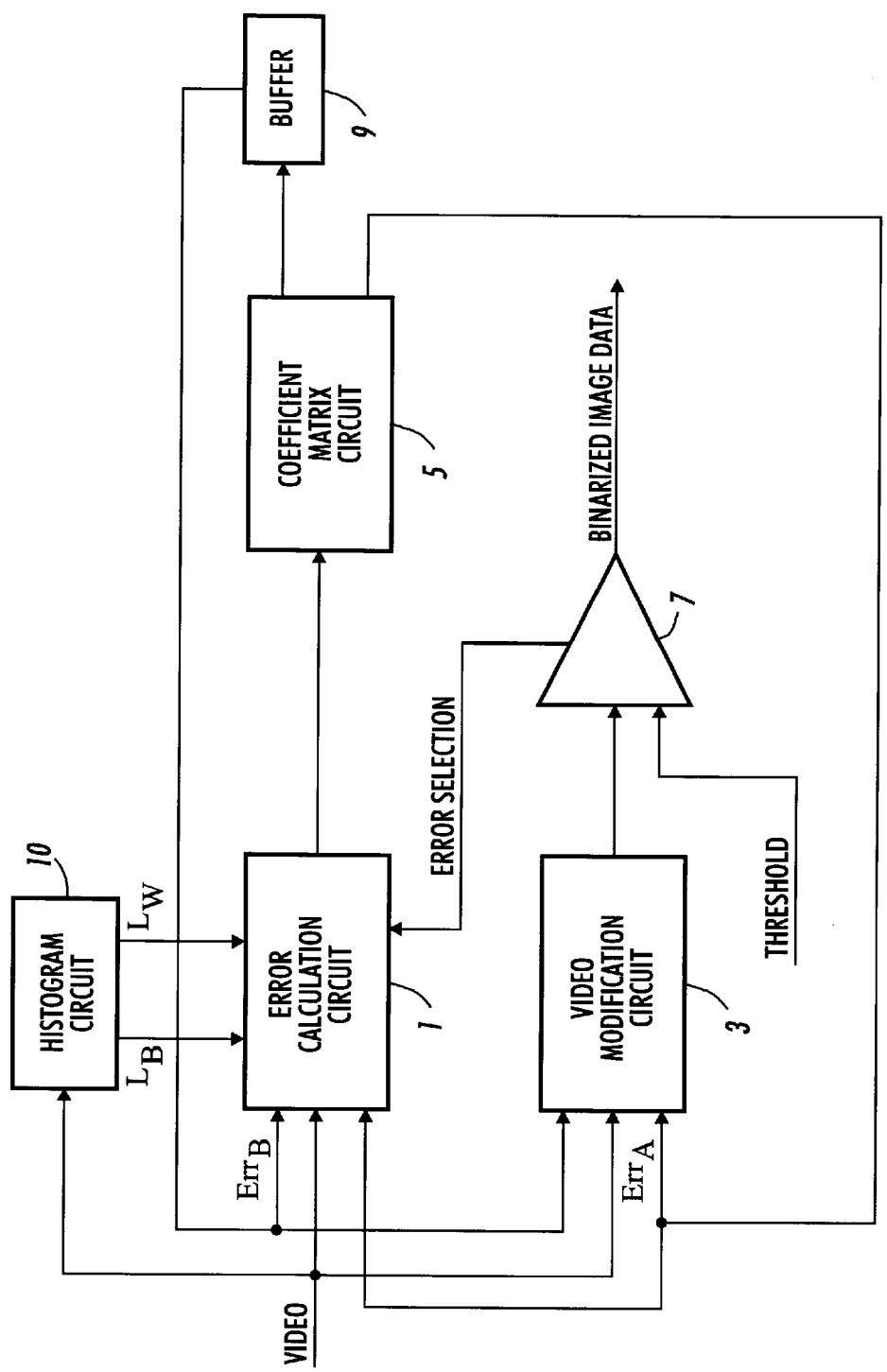
FIG. 29 is a block diagram illustrating implementation of the processes illustrated in FIGS. 24–28.

FIG. 29 illustrates a functional block diagram of the parallel pipeline high addressability error diffusion circuit according to the concepts of the present invention. In FIG. 29, the input video signal is fed into an error calculation circuit 1, a video modification circuit 3, and a histogram circuit 10. The histogram circuit 10 which utilizes conventional histogram techniques to determine the values LineBlack and LineWhite. The values LineBlack and LineWhite are fed to error calculation circuit 1. The error components $e_{FIFO}$ ($Err_B$) and $e_{FB}$ ($Err_A$) are also fed into the error calculation circuit 1. The error calculation circuit calculates all the various possible error values that can result from the presently occurring binarization process utilizing the method described above with respect to FIGS. 24, 25, 27, and 28. The selection of the proper error to be output by the error calculation circuit 1 is based upon the received error selection signal which will be discussed in more detail below.

The selected error value from the error calculation circuit 1 is fed into a coefficient matrix circuit 5 which distributes the error based upon a set of weighting coefficients. The coefficient matrix circuit 5 splits the error values into the two components $e_{FIFO}$ ($Err_B$) and $e_{FB}$ ($Err_A$). As noted before, the feedback error, $Err_A$, is fed back to the video modification circuit 3 and the error calculation circuit 1 from the coefficient matrix circuit 5. The video modification circuit 3 also receives the $Err_B$ from buffer 9.

The video modification circuit 3 produces the interpolated subpixel values for the high addressability error diffusion method wherein the interpolated subpixel values are fed into the binarization circuit 7 along with a threshold value. In the preferred embodiment of the present invention, the threshold value is 128. However, it is noted that this threshold value can be any value.

The binarization circuit 7 binarizes the inputted video data so as to output binarized image data for the utilization by an image rendering device. The binarization circuit 7 also produces the error selection signal which is utilized by the error calculation circuit 1 to choose the correct error value to be fed to the coefficient matrix circuit 5. This error selection signal represents the number of interpolated subpixels which are turned ON during the binarization process. Thus, the error calculation circuit 1 may include a multiplexer to make this selection.

As illustrated in FIG. 29, the error calculation circuit 1 is in parallel with the video modification circuit and the binarization circuit. Moreover, the high addressability error diffusion architecture of the present invention is implemented on an ASIC, thereby enabling hardware implementation so that the image data can be binarized within the time constraints and throughput specifications of a high speed image rendering device.

Figure 30:
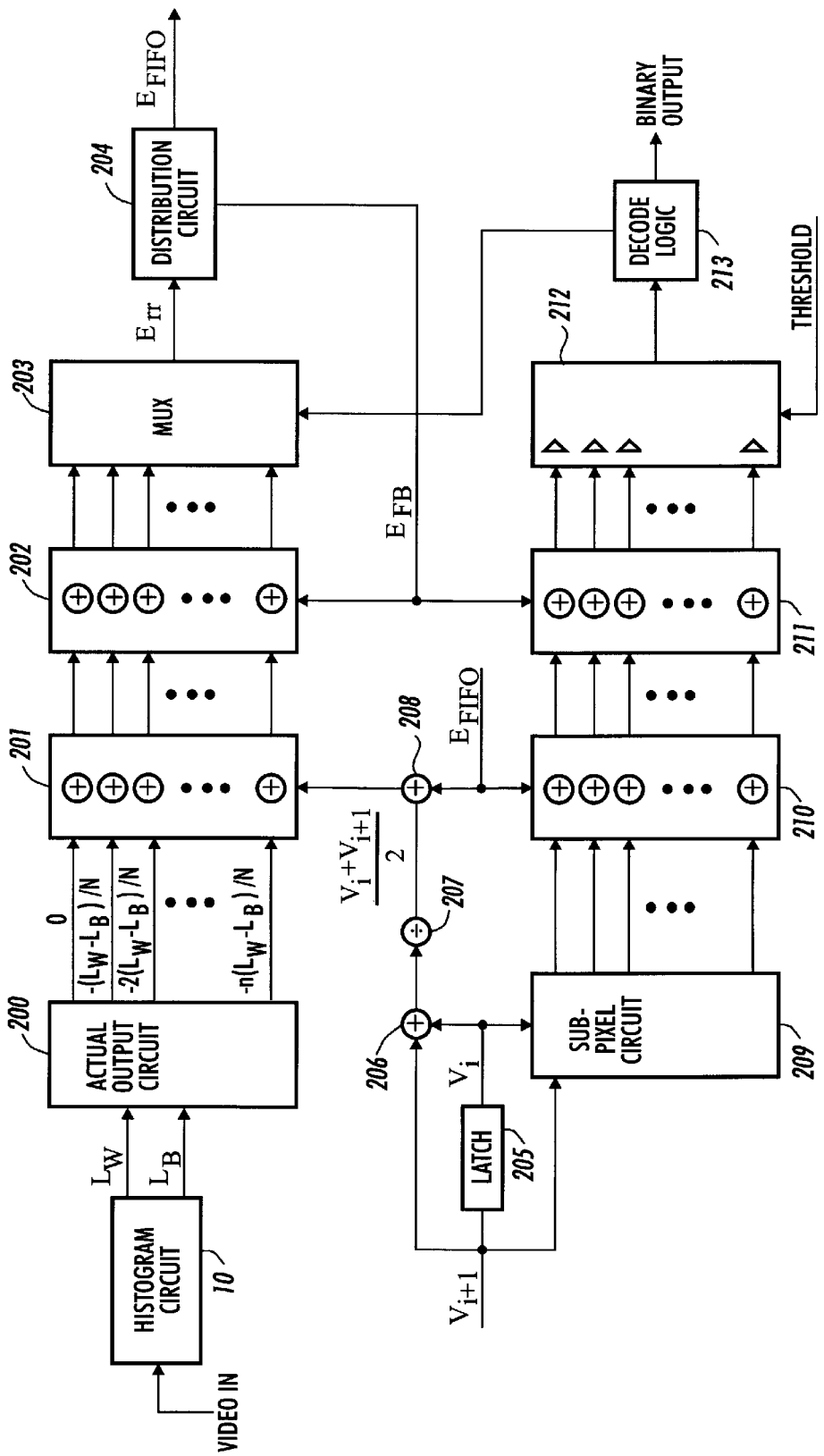
FIG. 30 is a block diagram illustrating circuitry implementation of the processes illustrated in FIGS. 24–28.

FIG. 30 illustrates a detail block diagram of the circuit corresponding to FIG. 29. As illustrated in FIG. 30, many of the computations, as previously described with respect to FIGS. 24, 25, 27, and 28, are carried out in parallel.

The video signal is fed to histogram circuit 10 which utilizes conventional histogram techniques to determine the values LineBlack and LineWhite. The values LineBlack and LineWhite are fed to actual output generation circuit 200. Pixel values $V_i$ and $V_{i+1}$ are obtained by the utilization of a latch 205 which latches the video signal so that two adjacent fastscan pixels are available for processing. The pixel values $V_i$ and $V_{i+1}$ are summed in adder 206 and the sum is divided in half by divider 207. The result from divider 207 is fed into adder 208 with the error term $e_{FIFO}$. The sum represents the desired output to the printer.

In parallel to the above described process, actual output generation circuit 200 produces all possible outputs to the printer based on the high addressability characteristic. It is noted that these values are negative since an adder is used for subtraction operations. If the high addressability characteristic is N, N possible actual outputs will be generated. Also in parallel to the above described process, a subpixel circuit 209 generated all the interpolated subpixels based on the screened pixel values $V_i$ and $V_{i+1}$.

Next, the error component q is added to each of the interpolated subpixels by adder 210. At the same time (in parallel thereto), each possible actual outputs (negative values) is individually added to the desired output by adder 201. In other words, N possible actual subpixel outputs are subtracted from the desired output to produce N possible error outputs.

In adders 211 and 202, a feedback error term $e_{FB}$ is added to each summation from adders 210 and 201, respectively. These computations are carried out in parallel. After competing these parallel computations, each interpolated subpixel from adder 211 is compared to a threshold value in threshold circuit 212. The subpixels having a value greater than or equal to the threshold value are turned ON. Threshold circuit outputs a number representing the number of sub pixels turned ON. This information is fed into a decode logic circuit which produces a binary therefrom to be sent to a printer.

Moreover, the error terms from adder 202 are fed into a multiplexer 203 which chooses which error term to propagate to downstream pixel. The error term is selected based on a control signal received from the decode logic circuit 213. The selected error term is fed into a distribution circuit 204 which produces the next feedback error and the error to be stored in a buffer for utilization in the processing of the next scanline.

By utilizing the above described systems and methods, the present invention is capable of maintaining a high number of grey levels available for printing by the printing system while also eliminating the production of "speckled" images.

In recapitulation, error diffusion requires a black and white reference value in order to calculate the error which is to be propagated downstream. In the high-addressable error diffusion process, this error is equal to the desired (grayscale) output minus the actual (binary) output; $e_{i+1} = (P0_i + P1_i)/2 - n*(LineBlack - LineWhite)/N$, where $e_{i+1}$ is the error to be propagated downstream, $P0_i$ and $P1_i$ are the input gray pixels used for interpolation after the error generated from previous pixels has been added, LineBlack and LineWhite are the black and white error diffusion reference values found through a histogram routine, N equals the number of high-addressable bits selected, and n equals the number of sub-pixels turned ON.

With respect to the histogram process, typically this function is performed by a histogram application specific integrated circuit (ASIC) or can inexpensively be calculated by simply detecting the maximum and minimum pixel value(s) of the previous scanline data. As noted above, a "running" average may also be useful in determining the "updated" value(s) of these reference levels.

The concepts of the present invention may also be extended to a two-pass auto-windowing environment. In this case, the histogram data is available for each window, and therefore, can be used to adjust the white and black reference levels (LineWhite and LineBlack, respectively) in order to optimize the rendering for each windowed region. One may also use the adjustment of these reference levels for each of the four separations in a color image (Le., CMYK) resulting in improved image quality.

In describing the present invention, the terms pixel and subpixel have been utilized. These terms may refer to an electrical (or optical, if fiber optics are used) signal which represent the physically measurable optical properties at a physically definable area on a receiving medium. The receiving medium can be any tangible document, photoreceptor, or marking material transfer medium. Moreover, the terms pixel and subpixel may refer to an electrical (or optical, if fiber optics are used) signal which represent the physically measurable optical properties at a physically definable area on a display medium A plurality of the physically definable areas for both situations represent the physically measurable optical properties of the entire physical image to be rendered by either a material marking device, electrical or magnetic marking device, or optical display device.

Lastly, tee term pixel may refer to an electrical (or optical, if fiber optics are used) signal which represents physical optical property data generated from a single photosensor cell when scanning a physical image so as to convert the physical optical properties of the physical image to an electronic or electrical representation. In other words, in this situation, a pixel is an electrical (or optical) representation of the physical optical properties of a physical image measured at a physically definable area on an optical sensor.

Although the present invention has been described in detail above, various modifications can be implemented without departing from the spirit of the present invention. For example, the preferred embodiment of the present invention has been descried with respect to a printing system; however, this screening/error diffusion method is readily implemented in a display system. Moreover, the screening and high addressability error diffusion method of the present invention can be readily implemented on an ASIC, programmable gate array, or in software, thereby enabling the placement of this process in a scanner, electronic subsystem, printer, or display device.

Moreover, various examples of the present mention has been described with respect to a video range of 0 to 255. However, it is contemplated by the present invention that the video range can be any suitable range to describe the grey level of the pixel being processed. Furthermore, the present invention is readily applicable to any rendering system, not necessarily a binary output device. It is contemplated that the concepts of the present invention are readily applicable to a four-level output terminal or higher.

Lastly, the present invention has been described with respect to a monochrome or black/white environment. However, the concepts of the present invention are readily applicable to a color environment. Namely, the high addressability error diffusion process of the present invention can be applied to each color space vale representing the color pixel.

While the present invention has been described with reference to various embodiments disclosed herein before, it is not to be combined to the detail set forth above, but is intended to cover such modifications or changes as made within the scope of the attached claims.

What is claimed is:

1. A method of diffusing an error generated from thresholding a grey level value representing a pixel, comprising the steps of:

(a) determining an actual background value and an actual black reference value for an image to be thresholded;

(b) receiving the grey level value representing the pixel, the grey level value having a first resolution;

(c) converting the grey level value to a second resolution, the second resolution being higher than the first resolution;

(d) thresholding the converted grey level value;

(e) generating an error value as a result of a threshold determination in said step (d) using the actual background value and black reference value determined in said step (a), the error value having a resolution corresponding to the first resolution; and (f) diffusing the error value to grey level values representing adjacent pixels.

2. The method as claimed in claim 1, wherein said step (c) comprises the substeps of.

(c1) computing a first grey level value; and (c2) computing a second grey level value.

3. The method as claimed in claim 2, wherein said step (c) further comprises the substep of:
  (c3) computing a plurality of subpixel grey level values $B_n$, the subpixel grey level values $B_n$ being equal to $P0+n(P1-P0)/N$, wherein n is equal to 0 to N−1, P0 is equal to the first grey level value, P1 is equal to the second grey value, and N is equal to a high addressability characteristic.

4. The method as claimed in clam 3, wherein said step (e) comprises the substeps of:
  (e1) calculating a desired output, the desired output being equal to a sum of the first and second grey level values divided by two;
  (e2) calculating an actual output, the actual output being equal to $n*(Lb-Lw)/N$ wherein n is a number of subpixels being equal to or greater than a threshold value, Lb is the determined actual black reference value, Lw is the determined actual background value, and N is a high addressability characteristic; and
  (e3) calculating the error to be equal to the desired output minus the actual output.

5. A system for diffusing an error generated from thresholding a grey level value representing a pixel, comprising:
  histogram means for determining an actual background value and an actual black reference value for an image to be thresholded;
  input means for receiving the grey level value representing the pixel, the grey level value having a first resolution;
  high addressability means for converting the grey level value to a second resolution, the second resolution being higher than the first resolution;
  threshold means for thresholding the converted grey level value;
  error means for generating an error value as a result of a threshold determination by said threshold means using the actual background value and black reference value determined by said histogram means, the error value having a resolution corresponding to the first resolution; and
  error diffusing means for diffusing the error value to grey level values representing adjacent pixels.

6. The system as claimed in claim 5, wherein said high addressability means computes a first grey level value and a second grey level value.

7. The system as claimed in claim 6, wherein said high addressability means further computes a plurality of subpixel grey values $B_n$, the subpixel grey level values $B_n$ being equal to $P0+n(P1-P0)/N$, wherein n is equal to 0 to N−1, P0 is equal to the first grey level value, P1 is equal to the second grey level value, and N is equal to a high addressability characteristic.

8. The system as claimed in clam 5, wherein said error means comprises:
  first means for calculating a desired output, the desired output being equal to a sum of the first and second grey level values divided by two;
  second means for calculating an actual output, the actual output being equal to $n*(Lb-Lw)/N$ wherein n is a number of subpixels being equal to or greater than a threshold value, Lb is the determined actual black reference value, Lw is the determined actual background value, and N is a high addressability characteristic; and
  third means for calculating the error to be equal to the desired output minus the actual output.

9. A method of generating an error from a threshold process, comprising the steps of:
  (a) determining an actual background value and an actual black reference value for an image to be thresholded;
  (b) thresholding a grey level value of a pixel having a first resolution; and
  (c) generating an error value as a result of thresholding the grey level value in said step (b) using the actual background value and black reference value determined in said step(a), the error value having a second resolution, the second resolution being lower than the first resolution.

10. The method as claimed in claim 9, further comprising the step of:
  (d) diffusing the error value to grey level values of pixels adjacent to the pixel being thresholded.

11. A system for generating an error from a threshold process, comprising:
  histogram means for determining an actual background value and an actual black reference value for an image to be thresholded;
  threshold means for thresholding a grey level value of a pixel having a first resolution; and
  error means for generating an error value as a result of thresholding by said threshold means using the actual background value and black reference value determined by said histogram means, the error value having a second resolution, the second resolution being lower than the first resolution.

12. The system as claimed in claim 11, further comprising:
  diffusing means for diffusing the error value to grey level values of pixels adjacent to the pixel being thresholded.

13. A printing system for rendering marks on a receiving medium, comprising:
  histogram means for determining an actual background value and an actual black reference value for an image to be thresholded;
  receiving means for receiving a grey level signal corresponding to a pixel having a first resolution;
  interpolation means for converting the grey level signal to a second resolution, the second resolution being higher than the first resolution;
  binarization means for binarizing the converted grey level signal so as to output a binary signal and an error signal the error signal having a resolution equal to the first resolution and being calculated using the actual background value and black reference value determined by said histogram means;
  diffusing means for diffusing the error value to grey level signals corresponding to pixels adjacent to the pixel having the first resolution; and
  rendering means for converting the binary signal into a mark on the receiving medium.

14. A method of diffusing an error generated from thresholding a grey level value representing a pixel, comprising the steps of:
  (a) determining an actual background value for an image to be thresholded;
  (b) receiving the grey level value representing the pixel, the grey level value having a first resolution;
  (c) converting the grey level value to a second resolution, the second resolution being higher than the first resolution;

(d) thresholding the converted grey level value;

(e) generating an error value as a result of a threshold determination in said step (d) using the actual background value determined in said step(a), the error value having a resolution corresponding to the first resolution; and (f) diffusing the error value to grey level values representing adjacent pixels.

15. A system for diffusing an error generated from thresholding a grey level value representing a pixel, comprising:

histogram means for determining an actual background value for an image to be thresholded;

input means for receiving the grey level value representing the pixel, the grey level value having a first resolution;

high addressability means for converting the grey level value to a second resolution, the second resolution being higher than the first resolution;

threshold means for thresholding the converted grey level value;

error means for generating an error value as a result of a threshold determination by said threshold means using the actual background value determined by said histogram means, the error value having a resolution corresponding to the first resolution; and error diffusing means for diffusing the error value to grey level values representing adjacent pixels.

16. The system as claimed in claim 15, wherein said high addressability means computes a first grey level value and a second grey level value.

17. A method of generating an error from a threshold process, comprising the steps of:

(a) determining an actual background value for an image to be thresholded;

(b) thresholding a grey level value of a pixel having a first resolution; and (c) generating an error value as a result of thresholding the grey level value in said step (b) using the actual background value determined in said step(a), the error value having a second resolution, the second resolution being lower than the first resolution.

18. The method as claimed in claim 17, further comprising the step of:

(d) diffusing the error value to grey level values of pixels adjacent to the pixel being thresholded.

19. A system for generating an error from a threshold process, comprising:

histogram means for determining an actual background value for an image to be thresholded;

threshold means for thresholding a grey level value of a pixel having a first resolution; and error means for generating an error value as a result of thresholding by said threshold means using the actual background value determined by said histogram means, the error value having a second resolution, the second resolution being lower than the first resolution.

20. A printing system for rendering marks on a receiving medium, comprising:

histogram means for determining an actual background value for an image to be thresholded;

receiving means for receiving a grey level signal corresponding to a pixel having a first resolution;

interpolation means for converting the grey level signal to a second resolution, the second resolution being higher than the first resolution;

binarization means for binarizing the converted grey level signal so as to output a binary signal and an error signal the error signal having a resolution equal to the first resolution and being calculated using the actual background value determined by said histogram means;

diffusing means for diffusing the error value to grey level signals corresponding to pixels adjacent to the pixel having the first resolution; and rendering means for converting the binary signal into a mark on the receiving medium.

21. A method of diffusing an error generated from thresholding a grey level value representing a pixel, comprising the steps of:

(a) determining an actual black reference value for an image to be thresholded;

(b) receiving the grey level value representing the pixel the grey level value having a first resolution;

(c) converting the grey level value to a second resolution, the second resolution being higher than the first resolution;

(d) thresholding the converted grey level value;

(e) generating an error value as a result of a threshold determination in said step (d) using the black reference value determined in said step (a), the error value having a resolution corresponding to the first resolution; and (f) diffusing the error value to grey level values representing adjacent pixels.

22. A system for diffusing an error generated from thresholding a grey level value representing a pixel, comprising:

histogram means for determining an actual black reference value for an image to be thresholded;

input means for receiving the grey level value representing the pixel, the grey level value having a first resolution;

high addressability means for converting the grey level value to a second resolution, the second resolution being higher than the first resolution;

threshold means for thresholding the converted grey level value;

error means for generating an error value as a result of a threshold determination by said threshold means using the black reference value determined by said histogram means, the error value having a resolution corresponding to the first resolution; and error diffusing means for diffusing the error value to grey level values representing adjacent pixels.

23. The system as claimed in claim 22, wherein said high addressability means computes a first grey level value and a second grey level value.

24. A method of generating an error from a threshold process, comprising the steps of:

(a) determining an actual black reference value for an image to be thresholded;

(b) thresholding a grey level value of a pixel having a first resolution; and (c) generating an error value as a result of thresholding the grey level value in said step (b) using the black reference value determined in said step(a), the error value having a second resolution, the second resolution being lower than the first resolution.

25. The method as claimed in claim 24, further comprising the step of:
   (d) diffusing the error value to grey level values of pixels adjacent to the pixel being thresholded.

26. A system for generating an error from a threshold process, comprising:
   histogram means for determining an actual black reference value for an image to be thresholded;
   threshold means for thresholding a grey level value of a pixel having a first resolution; and
   error means for generating an error value as a result of thresholding by said threshold means using the black reference value determined by said histogram means, the error value having a second resolution, the second resolution being lower than te first resolution.

27. A printing system for rendering marks on a receiving medium, comprising:
   histogram means for determining an actual black reference value for an image to be thresholded;
   receiving means for receiving a grey level signal corresponding to a pixel having a first resolution;
   interpolation means for converting the grey level signal to a second resolution, the second resolution being higher than the first resolution;
   binarization means for binarizing the converted grey level signal so as to output a binary signal and an error signal, the error signal having a resolution equal to the first resolution and being calculated using the black reference value determined by said histogram means;
   diffusing means for diffusing the error value to grey level signals corresponding to pixels adjacent to the pixel having the first resolution; and
   rendering means for converting the binary signal into a mark on the receiving medium.

28. A method of generating an error generated from thresholding a grey level value representing a pixel, comprising the steps of:
   (a) determining an actual background value for an image to be thresholded;
   (b) thresholding the grey level value;
   (c) generating an error value as a result of a threshold determination in said step (b) using the actual background value determined in said step(a); and
   (d) diffusing the error value to grey level signals corresponding to pixels adjacent to the pixel.

29. A system for generating an error generated from thresholding a grey level value representing a pixel comprising:
   histogram means for determining an actual background value for an image to be thresholded;
   threshold means for thresholding the grey level value;
   error means for generating an error value as a result of a threshold determination by said threshold means using the actual background value determined by said histogram means; and
   diffusing means for diffusing the error value to grey level signals corresponding to pixels adjacent to the pixel.

30. A method of generating an error generated from thresholding a grey level value representing a pixel comprising the steps of:
   (a) determining an actual black reference value for an image to be thresholded;
   (b) thresholding the grey level value;
   (c) generating an error value as a result of a threshold determination in said step (b) using the black reference value determined in said step(a); and
   (d) diffusing the error value to grey level signals corresponding to pixels adjacent to the pixel.

31. A system for generating an error generated from thresholding a grey level value representing a pixel comprising:
   histogram means for determining an actual black reference value for an image to be thresholded;
   threshold means for thresholding the grey level value;
   error means for generating an error value as a result of a threshold determination by said threshold means using the black reference value determined by said histogram means; and
   diffusing means for diffusing the error value to grey level signals corresponding to pixels adjacent to the pixel.

* * * * *